US011835746B2

(12) United States Patent
Ayres et al.

(10) Patent No.: US 11,835,746 B2
(45) Date of Patent: Dec. 5, 2023

(54) COHERENT SKEW MIRRORS

(71) Applicant: Akonia Holographics LLC, Longmont, CO (US)

(72) Inventors: Mark R. Ayres, Boulder, CO (US); Adam Urness, Boulder, CO (US); Kenneth E. Anderson, Longmont, CO (US); Friso Schlottau, Lyons, CO (US)

(73) Assignee: Akonia Holographics LLC, Longmont, CO (US)

( * ) Notice: Subject to any disclaimer, the term of this patent is extended or adjusted under 35 U.S.C. 154(b) by 55 days.

(21) Appl. No.: 17/409,231

(22) Filed: Aug. 23, 2021

(65) Prior Publication Data

US 2021/0382218 A1    Dec. 9, 2021

Related U.S. Application Data

(63) Continuation of application No. 16/144,390, filed on Sep. 27, 2018, now Pat. No. 11,119,261.
(Continued)

(51) Int. Cl.
*G02B 5/32* (2006.01)
*G02B 27/44* (2006.01)
(Continued)

(52) U.S. Cl.
CPC .............. *G02B 5/32* (2013.01); *G02B 27/44* (2013.01); *G03H 1/0402* (2013.01); *G03H 1/06* (2013.01); *G03H 2001/0436* (2013.01)

(58) Field of Classification Search
CPC ............ G02B 2027/0174; G02B 23/08; G02B 27/0172; G02B 27/1086; G02B 27/44; G02B 5/32; G02F 1/133345; G02F 1/13606; G02F 1/136209; G02F 1/136213; G02F 1/136227; G02F 2201/40;
(Continued)

(56) References Cited

U.S. PATENT DOCUMENTS 5,295,208 A    3/1994  Caulfield et al.
5,416,616 A    5/1995  Jenkins et al.
(Continued)

FOREIGN PATENT DOCUMENTS

WO    2017149064 A1    9/2017
WO    2017176389 A1    10/2017

*Primary Examiner* — Collin X Beatty
(74) *Attorney, Agent, or Firm* — Michael H. Lyons

(57) ABSTRACT

Systems and methods for performing coherent diffraction in an optical device are disclosed. An optical device may include a grating medium with a first hologram having a first grating frequency. A second hologram at least partially overlapping the first hologram may be provided in the grating medium. The second hologram may have a second grating frequency that is different from the first grating frequency. The first and second holograms may be pair-wise coherent with each other. A manufacturing system may be provided that writes the pair-wise coherent holograms in a grating medium using a signal beam and a reference beam. Periscopes may redirect portions of the signal and reference beams towards a partial reflector, which combines the beams and provides the combined beam to a detector. A controller may adjust an effective path length difference between the signal and reference beams based on a measured interference pattern.

16 Claims, 24 Drawing Sheets

Related U.S. Application Data

(60) Provisional application No. 62/580,317, filed on Nov. 1, 2017.

(51) Int. Cl.
*G03H 1/04* (2006.01)
*G03H 1/06* (2006.01)

(58) Field of Classification Search
CPC .. G03H 1/0248; G03H 1/0402; G03H 1/0486; G03H 1/16; G03H 1/265; G03H 2001/0436; G03H 2001/0439; G03H 2001/0491; G03H 2001/266; G03H 2222/20; G03H 2223/18; G03H 2223/50
See application file for complete search history.

(56) References Cited

U.S. PATENT DOCUMENTS

| | | | |
|---|---|---|---|
| 6,169,614 B1 | 1/2001 | Whitcomb et al. | |
| 6,322,933 B1 | 11/2001 | Daiber et al. | |
| 6,614,741 B1 | 9/2003 | Hesselink et al. | |
| 7,116,626 B1 | 10/2006 | Woods et al. | |
| 7,418,170 B2 | 8/2008 | Mukawa et al. | |
| 7,502,168 B2 * | 3/2009 | Akutsu | G02B 27/4272 359/15 |
| 7,729,579 B1 | 6/2010 | Greiner et al. | |
| 7,764,413 B2 | 7/2010 | Levola | |
| RE41,570 E | 8/2010 | Greiner et al. | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 9,470,896 B2 | 10/2016 | Dobschal et al. | |
| 9,703,260 B2 | 7/2017 | Ayres et al. | |
| 9,791,703 B1 | 10/2017 | Vallius et al. | |
| 9,891,363 B2 | 2/2018 | Ayres et al. | |
| 10,180,520 B2 | 1/2019 | Ayres et al. | |
| 10,185,069 B2 | 1/2019 | Ayres et al. | |
| 2009/0020771 A1 | 1/2009 | Kim et al. | |
| 2013/0250430 A1 | 9/2013 | Robbins et al. | |
| 2014/0140654 A1 | 5/2014 | Brown et al. | |
| 2015/0277123 A1 | 10/2015 | Chaum et al. | |
| 2016/0154150 A1 | 6/2016 | Simmonds et al. | |
| 2017/0031160 A1 | 2/2017 | Popovich et al. | |
| 2017/0276940 A1 * | 9/2017 | Popovich | G02B 27/01 |
| 2017/0285349 A1 | 10/2017 | Ayres et al. | |
| 2019/0094981 A1 | 3/2019 | Bradski et al. | |

* cited by examiner

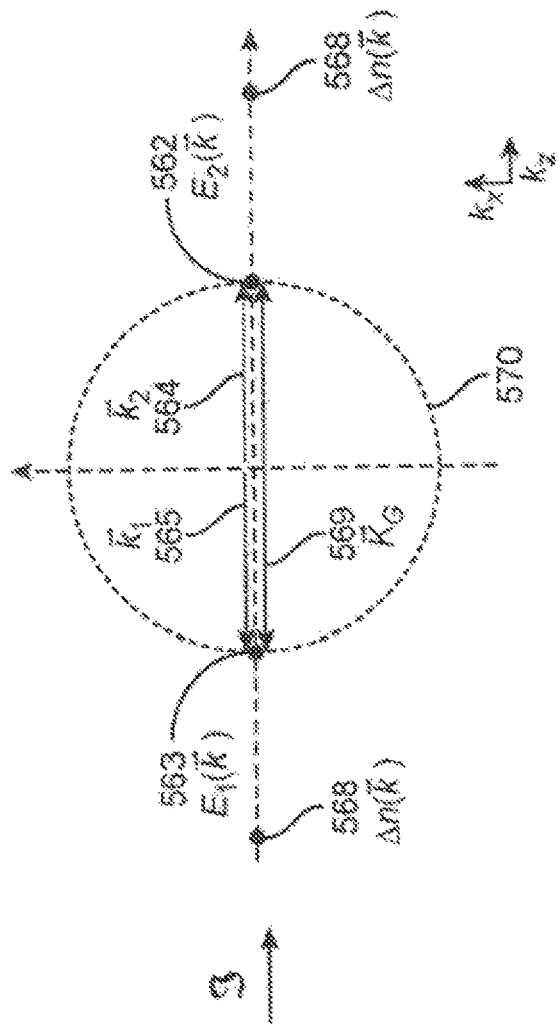
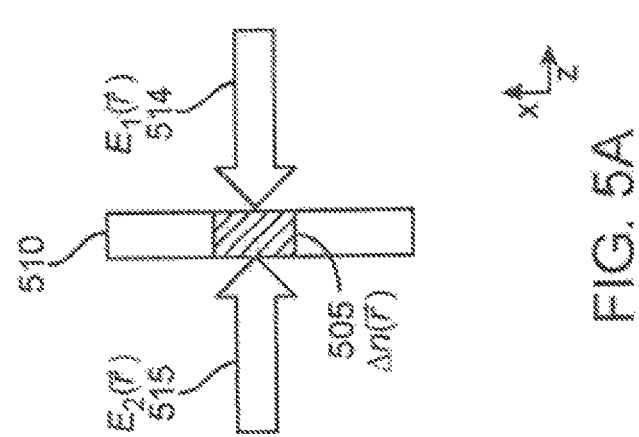
FIG. 5A
FIG. 5B

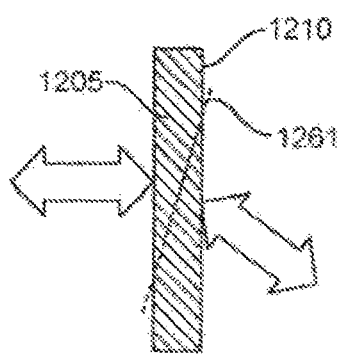
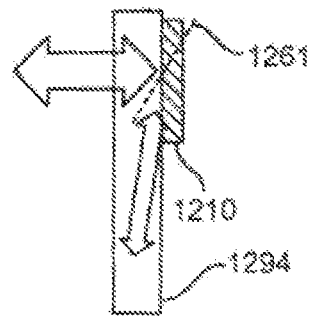
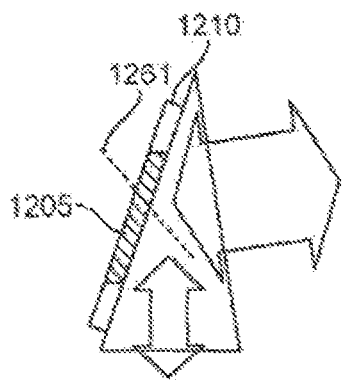
FIG. 12A  FIG. 12B  FIG. 12C
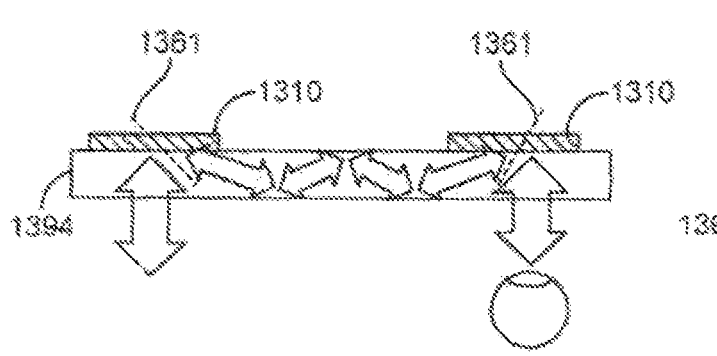
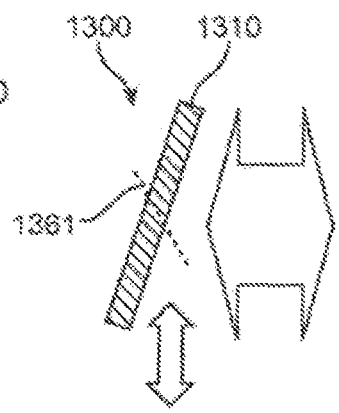
FIG. 13A  FIG. 13B

COHERENT SKEW MIRRORS

This application is a continuation of U.S. patent application Ser. No. 16/144,390, filed Sep. 27, 2018, which claims the benefit of U.S. provisional patent application No. 62/580,317, filed on Nov. 1, 2017, each of which are hereby incorporated by reference herein in their entireties.

BACKGROUND

The present disclosure relates generally to optical devices, including optical devices having sets of pair-wise coherent grating structures.

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal, i.e., the reflective axis is perpendicular to the mirror surface. Because of this constraint on the reflective axis, a dielectric mirror is disposed in some devices in a configuration that is suboptimal for purposes other than reflection. Similarly, the reflective axis being constrained to surface normal makes a dielectric mirror entirely inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light avoids the constraint inherent in dielectric mirrors that reflective axis coincide with surface normal. However, where a substantially constant reflective axis is required, a conventional grating structure is substantially limited to a single wavelength (or very narrow range of wavelengths) for a given angle of incidence. Similarly, a conventional grating structure is limited to a single angle of incidence (or very narrow range of incidence angles), in order to reflect light of a specified wavelength about a constant reflective axis.

Accordingly, requirements for a relatively simple device that reflects light about a reflective axis not constrained to surface normal, and whose angle of reflection for a given angle of incidence is constant at multiple wavelengths, are not met by currently available reflective devices comprising either reflective grating structures or dielectric mirrors. A need therefore exists for such a reflective device, and such need may be acute in head mounted display devices.

SUMMARY

The described features generally relate to one or more improved methods, systems, or devices for performing diffraction using coherent skew mirrors that include pair-wise coherent holograms. The holograms may be implemented within optical media as holographic optical elements.

In some examples, an optical device is provided that includes a grating medium and a first hologram in the grating medium that has a first grating frequency. A second hologram at least partially overlapping the first hologram may be provided in the grating medium. The second hologram may have a second grating frequency that is different from the first grating frequency. The first and second holograms may be pair-wise coherent with each other. For example, when the first and second holograms both receive a coherent probe beam, the first hologram may generate a first diffracted beam, and the second hologram may generate a second diffracted beam that is in a fixed phase relationship with the first diffracted beam. A set of holograms such as these may be formed in the grating medium, each having a respective grating frequency. The first and second holograms may have adjacent grating frequencies among the set of holograms. If desired, a spectral peak of light diffracted by the first hologram may overlap with a spectral null of light diffracted by the second hologram.

In order to manufacture pair-wise coherent holograms such as these, a hologram writing system may be provided that writes the pair-wise coherent holograms in a grating medium using a signal beam and a reference beam. A first light redirecting element such as a first periscope may redirect a portion of the signal beam towards a partial reflector. A second light redirecting element such as a second periscope may redirect a portion of the reference beam towards the partial reflector. The partial reflector may generate a combined beam by combining the portion of the signal beam and the portion of the reference beam. A detector may measure an interference pattern associated with the combined beam. A controller may adjust an effective path length difference between the signal beam and the reference beam based on the measured interference pattern. For example, the controller may adjust a piezo-actuated phase shifting mirror that operates on a given one of the signal and reference beams. The controller may include a servo controller that adjusts the effective path length to compensate for physical vibrations detected by the detector. This process may be iterated to actively ensure the alignment and coherence of the signal and reference beams for writing the pair-wise coherent holograms in the grating medium. Other manufacturing methods and systems may be used if desired.

BRIEF DESCRIPTION OF DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A is a cross-section view of an illustrative hologram recorded in a grating medium in accordance with some embodiments.

FIG. 5B is a cross-section view of a k-space representation of an illustrative single sinusoidal hologram in accordance with some embodiments.

FIG. 12A is a cross-section view illustrating reflective properties of an illustrative skew mirror in accordance with some embodiments.

FIG. 12B is a cross-section view illustrating reflective properties of an illustrative skew mirror in accordance with some embodiments.

FIG. 12C is a cross-section view illustrating reflective properties of an illustrative skew mirror in accordance with some embodiments.

FIG. 13A is a cross-section view illustrating reflective properties of an illustrative skew mirror in accordance with some embodiments.

FIG. 13B is a cross-section view illustrating reflective properties of an illustrative skew mirror in accordance with some embodiments.

DETAILED DESCRIPTION

Embodiments of the present disclosure include a diffractive device including a grating medium within which resides a hologram or other grating structures. The grating medium, by virtue of the grating structures residing therein, has physical properties that allow it to diffract light about an axis, referred to as a reflective axis, wherein angle of diffraction (henceforth referred to as angle of reflection) is substantially constant, (e.g. it varies by less than) 1° for multiple wavelengths of light incident upon the grating medium at a given angle of incidence. In some embodiments, the above phenomenon is observed for multiple angles of incidence. The grating structures may exhibit pair-wise coherence.

Similarly, embodiments typically have a substantially constant reflective axis across a range of incidence angles for incident light of a given wavelength, and this phenomenon may be observed with incident light at various wavelengths. In some embodiments, the reflective axis remains substantially constant for every combination of a set of multiple incidence angles and a set of multiple wavelengths In some embodiments, the grating structures includes a hologram generated by interference between multiple light beams referred to as recording beams. Typically, but not necessarily, the grating structures includes multiple holograms. The multiple holograms may be recorded using recording beams incident upon the grating medium at angles that vary among the multiple holograms, and/or using recording beams whose wavelengths vary among the multiple holograms. In some embodiments, the grating structures include a hologram recorded using two recording beams whose angles of incidence upon the grating medium vary while the hologram is being recorded, and/or whose wavelengths vary while the hologram is being recorded. Embodiments further include a device wherein the reflective axis differs from surface normal of the grating medium by at least 1.0 degree; or at least by 2.0 degrees; or at least by 4.0 degrees; or at least by 9.0 degrees. The grating structures (e.g., a set of holograms in a grating medium) may sometimes be referred to collectively herein as a skew mirror, as described in greater detail below. Two or more holograms in the skew mirror may be pair-wise coherent (e.g., the skew mirror may be a coherent skew mirror).

Figure 1A:
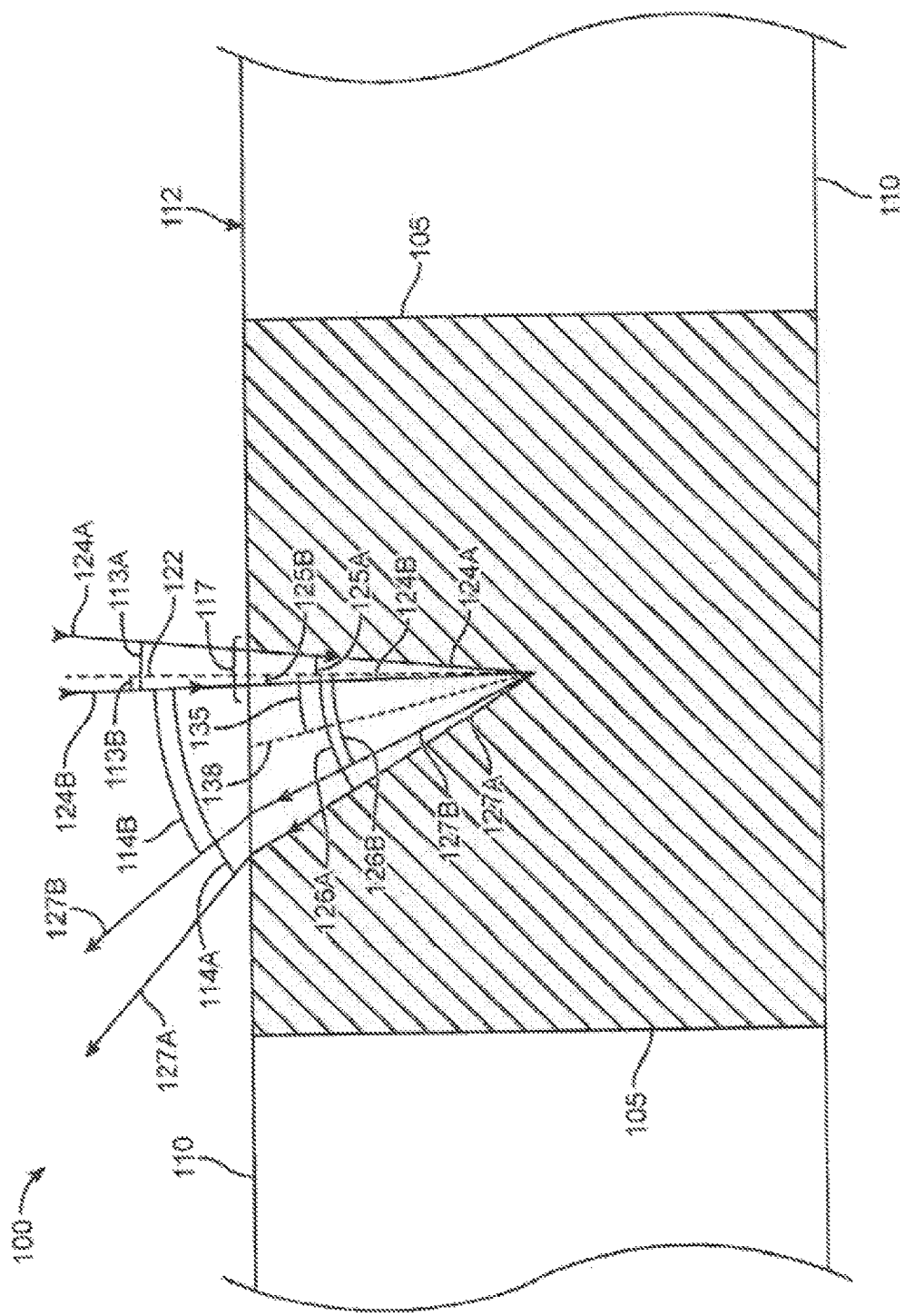
FIG. 1A is a cross-section view illustrating reflective properties of an illustrative skew mirror in accordance with some embodiments.
Figure 1B:
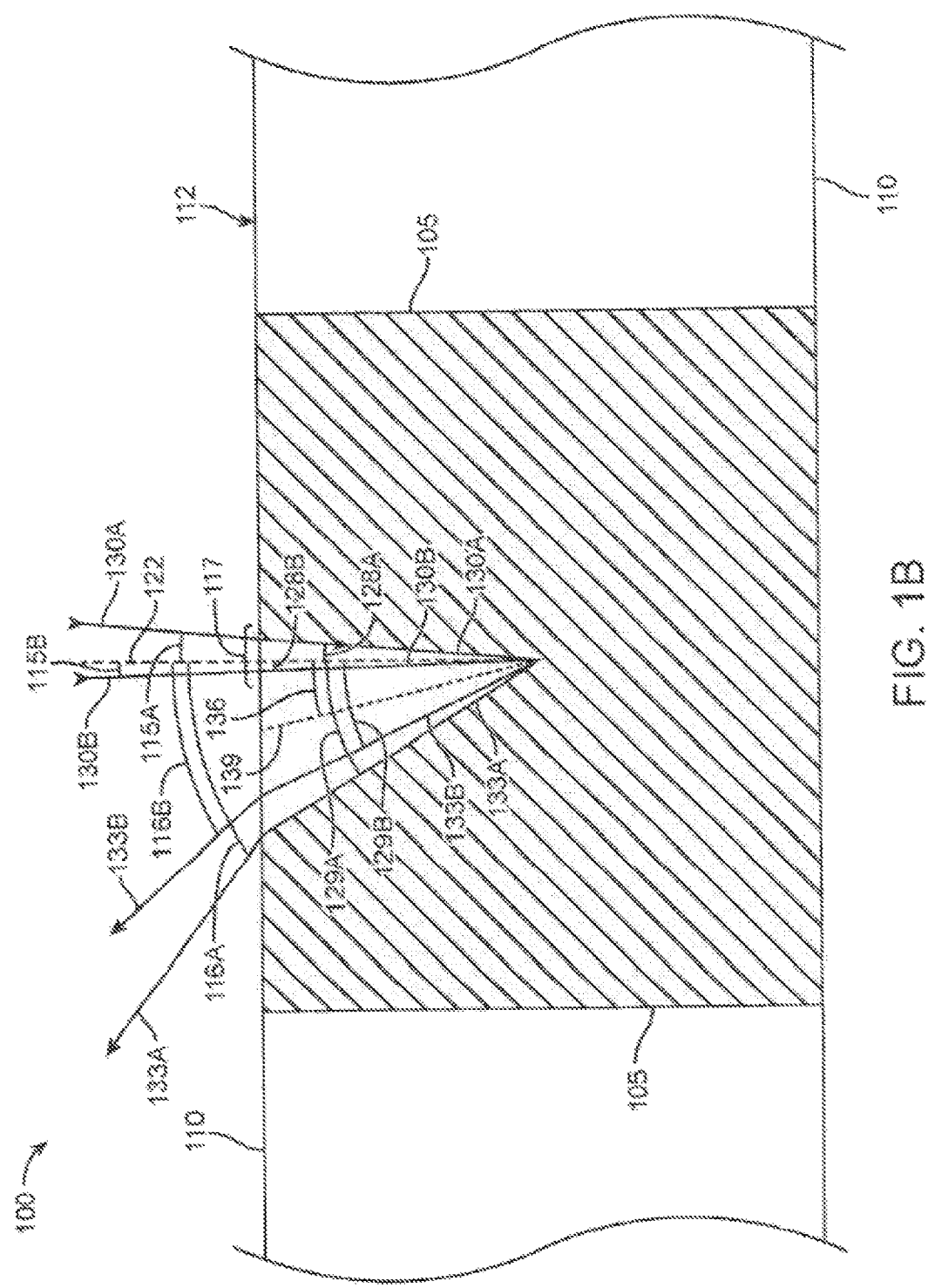
FIG. 1B is a cross-section view illustrating reflective properties of an illustrative skew mirror in accordance with some embodiments.

A first embodiment skew mirror 100 is illustrated in FIGS. 1A and 1B. The first embodiment skew mirror 100 (sometimes referred to herein as a set of gratings or volume holographic grating structures) includes a grating structure 105 (shown by diagonal hatch lines in FIGS. 1A and 1B) residing in a grating medium 110. For purposes of clarity, the diagonal hatch lines are omitted in a region within the grating medium 110 proximate figure elements indicating light, axes, and angles. However, grating structure 105 typically occupies the region described above. The grating structure 105 of the first embodiment includes multiple holograms that at least partially spatially overlap with each other in the grating medium 110.

The multiple holograms are recorded into the grating medium internal volume and thus extend below the grating medium surface 112. Accordingly, they are sometimes referred to as volume holograms. The multiple holograms of the first embodiment comprise forty eight (48) volume holograms, recorded with recording beams having a wavelength of 405 nm. Each of the 48 volume holograms typically at least partially spatially overlaps all others of the 48 volume holograms in the grating medium 110. In some embodiments, each of the multiple holograms at least partially spatially overlaps at least one, but not all, of the other of the multiple holograms. Recording the 48 holograms of the first embodiment skew mirror is described below in a first method of making a skew mirror. In some embodiments, the grating structure includes between 1 and 48 holograms; or between 4 and 25 holograms; or at least 5 holograms; or at least 9 holograms; or at least 11 holograms; or at least 24 holograms.

The first embodiment grating medium 110 may be a recording medium that is approximately 200 urn thick, has an M/# of approximately 18, and a refractive index of approximately 1.50 for 405 nm light, as just one example. Optical recording mediums such as this are a type of grating medium in which grating structures can be recorded by optical means. Grating mediums are typically, but not necessarily, at least 70 um thick to approximately 1.2 mm thick. The grating medium may undergo relatively little shrinkage (usually about 0.1% to 0.2%) as a result of recording volume holograms. Variations of grating mediums include, but are not limited to, photorefractive crystals, dichromated gelatin, photo-thermo-refractive glass, and film containing dispersed silver halide particles.

Variations of the first embodiment skew mirror 100 may include an additional layer such as a glass cover or glass substrate (not shown in FIGS. 1A and 1B). The additional layer may serve to protect the grating medium from contamination, moisture, oxygen, reactive chemical species, damage, and the like. The additional layer is typically refractive index matched to the grating medium 110. Because the refractive index for the additional layer is usually very close to the refractive index of the grating medium, refraction of light at the interface of the additional layer and the grating medium can usually be ignored. For the first embodiment, refractive indices for both the additional layer and the grating medium are approximately 1.5 for light having a wavelength of 405 nm. For clarity, the additional layer is not shown in FIGS. 1A and 1B.

As best seen in FIG. 1A, the grating structure 105 of the first embodiment has the physical property of being configured to reflect a first incident light 124A, 124B, about a first reflective axis 138 (shown in broken line). The first incident light consists essentially of a collimated, monochromatic light beam. The first incident light furthermore includes a first wavelength of 532 nm and is incident upon the grating medium 110 at a specific site 117. The first reflective axis 138 differs from surface normal 122 of the grating medium by a first reflective axis angle 135 of +13.759 degrees (internal, relative to surface normal), where the first incident light has an first internal angle of incidence 125A, 125B relative to surface normal, from −4.660 degrees (shown as first incident light 124A) to +1.933 degrees (shown as first incident light 124B), resulting in a range of 6.593 degrees. The first internal angles of incidence for the first incident light include one hundred (100) different internal angles spaced at angle intervals of about 0.067 degrees, from −4.660 degrees to +1.933 degrees. In some variations of the first embodiment skew mirror, the first internal angles of incidence for the first incident light include ten (10) different internal angles spaced at angle intervals of about 0.67 degrees, from −4.660 degrees to +1.933 degrees. Throughout this specification and appended claims, identified angles and angle values refer to internal angles relative to surface normal, unless clearly indicated otherwise. These example angles are merely illustrative and non-limiting.

As shown FIG. 1A, first incident light 124A, having a first internal angle of incidence of 125A of −4.660 degrees relative to surface normal, is reflected by the grating structure 105 as first reflected light 127A, having a first internal angle of reflection 126A of +32.267 degrees relative to surface normal. First incident light 124B, having a first internal angle of incidence 125B relative to surface normal of +1.933 degrees, is reflected as first reflected light 127B having a first internal angle of reflection 126B of +25.668 degrees. First reflected light 127A, 127B has the first wavelength, e.g., in the first embodiment the first reflected light has a wavelength of 532 nm.

Incident light and its reflection are bisected by the reflective axis such that the internal angle of incidence of the incident light relative to the reflective axis has the same magnitude as the internal angle of reflection of the reflected light relative to the reflective axis. Thus it can be said that the incident light and its reflection exhibit bilateral symmetry about the reflective axis.

As best seen in FIG. 1B, the grating structure 105 of the first embodiment is further configured to reflect second incident light 130A, 130B about a second reflective axis 139. The second incident light is essentially a collimated, monochromatic light beam. The second incident light furthermore includes a second wavelength of 513 nm and is incident upon the grating medium 110 at the specific site 117. The specific site 117 includes an area of the grating medium surface 112 upon which both the first and second incident light shine. The second reflective axis 139 differs from surface normal 122 of the grating medium by a second reflective axis angle 136 of +13.693 degrees (internal) relative to surface normal, where the second incident light has a second internal angle of incidence, relative to surface normal, from −4.660 degrees to +1.933 degrees. The second internal angle of incidence includes one hundred (100) different internal angles spaced at angle intervals of approximately 0.067 degrees, from −4.660 degrees to +1.933 degrees. In some variations of the first embodiment skew mirror, the second internal angles of incidence for the second incident light include ten (10) different internal angles spaced at angle intervals of about 0.67 degrees, from −4.660 degrees to +1.933 degrees. These angles are merely illustrative and non-limiting.

As shown in FIG. 1B, second incident light 130A, having a second internal angle of incidence 128A of −4.660 degrees relative to surface normal, is reflected by the grating structure 105 as second reflected light 133A, having a second internal angle of reflection 133A of +32.075 degrees relative to surface normal. Second incident light 130B, having a second internal angle of incidence 128B relative to surface normal of +1.933 degrees, is reflected as second reflected light 133B having a second internal angle of reflection 129B of +25.273 degrees. Second reflected light 133A, 133B has the second wavelength, e.g., in the first embodiment the second reflected light has a wavelength of 513 nm.

The first wavelength (532 nm) differs from the second wavelength (513 nm) by 19 nm, which can be represented by a value referred to as a wave fraction (WF), defined as $$WF = \frac{(\lambda 1 - \lambda 2)}{(\lambda 1 + \lambda 2)/2},$$

where $\lambda 1$=a longer wavelength among multiple wavelengths, and $\lambda 2$=a shorter wavelength among the multiple wavelengths. Thus where the multiple wavelengths consist of a first wavelength of 532 nm and a second wavelength of 513 nm, $$WF = \frac{(532 - 513)}{(532 + 5)/2} = 0.036.$$

Similarly, where the multiple wavelengths consist of a continuous spectrum from 390 nm or less to at least 700 nm, WF≥0.57. Embodiments include, but are not limited to, variations in which WF≥0.005; WF≥0.010; WF≥0.030; WF≥0.10; WF≥0.250; WF≥1.0; or WF≥2.0. The wave fraction (WF) defined by a longer ($\lambda 1$) and shorter ($\lambda 2$) wavelengths in the range typically, but not necessarily, includes a continuous spectrum of wavelengths between $\lambda 1$ and $\lambda 2$.

The second reflective axis angle 136 differs from the first reflective axis angle 135 by 0.0661 degree. Accordingly, the second reflective axis is substantially coincident with the first reflective axis, meaning that the second reflective axis angle 136 differs from first reflective axis angle 135 by 1.0 degree or less. Such small difference between reflecting axis angles across a range of wavelengths (in this case, across a WF of 0.039) can be a necessity where a nondispersive mirror is required. For some applications, the difference between reflective axis angles should be 0.250 degree or less for WF=0.030. Similarly, for some other applications, the difference between reflective axis angles should be equal 0.10 degree or less for WF=0.030.

Relative to the first reflective axis, internal angles of incidence of the first incident light vary from −11.867 degrees to −18.464 degrees. Relative to the second reflective axis, internal angles of incidence of the second incident light vary from −11.670 degrees to −18.368 degrees. Thus it can be said that each of the first incident light and second incident light is offset from the first reflective axis by at least 11.670 degrees. In embodiments, incident light may be offset from its reflective axis by an internal angle of at least 1.0 degree; by at least 2.0 degrees; by at least 5.0 degrees; or by at least 9.0 degrees. A skew mirror or other reflective device configured to reflect incident light that is offset from the incident light's reflective axis can be advantageous in some applications. For example, in a head mounted display it may be advantageous to reflect an image toward a user's eye, but not to retro-reflect the image back toward its source. Such reflection toward a user's eye typically requires that incident light be offset from its reflective axis by an internal angle of at least 5.0 degrees, and more typically by at least 9.0 degrees. Similarly, a device utilizing total internal reflection typically requires that incident light be offset from its reflective axis.

First embodiment external angles relative to surface normal for incident light and its reflection are also illustrated in FIGS. 1A and 1B. As seen in FIG. 1A, external angles relative to surface normal for first incident light 124A, 124B ranges from first incident light external angle 113A of −7.000 degrees to first incident light external angle 113B of +2.900 degrees. As seen in FIG. 1B, external angles relative to surface normal for second incident light 130A, 130B ranges from second incident light external angle 115A of −7.000 to second incident light external angle 115B of +2.900 degrees. First reflected light external angles 114A, 114B and second reflected light external angles 116A, 116B are also illustrated in FIGS. 1A and 1B, respectively. External angles are measured with the skew mirror residing in air, with refraction occurring at the skew mirror/air boundary.

The physical properties of the first embodiment allow it to reflect light having other wavelengths, and to reflect light incident upon the grating medium at other angles. For example, the first embodiment grating structure's reflective properties allow it to reflect light having a wavelength of 520.4 nm about a reflective axis having a mean reflective axis angle of +13.726 degrees that varies by 0.10 degree or less where angles of incidence of the 520.4 nm light range from −6.862 degrees to +13.726 degrees and all angles in between, for a range of 20.588 degrees. In another example of its reflective properties, the first embodiment is configured to reflect incident light about a reflective axis (having a mean reflective axis angle of +13.726°) that varies by 0.20 degree or less for all wavelengths from 503 nm to 537 nm (a range of 34 nm, WF=0.065, including a continuous spectrum of wavelengths between 503 nm and 537 nm), where the angle of incidence (internal, relative to surface normal) is −1.174 degrees.

For clarity, light in FIGS. 1A and 1B is illustrated as being reflected at a point residing proximate a center of the grating structure 105. However, light is typically reflected throughout the grating structure rather than at a specific point. In some embodiments, the first incident light and the second incident light have wavelengths other than 532 and 513, respectively. Similarly, embodiments include first and second reflective axes that may be coincident with surface normal, or may differ from surface normal. The example of FIGS. 1A and 1B is merely illustrative.

Figure 2A:
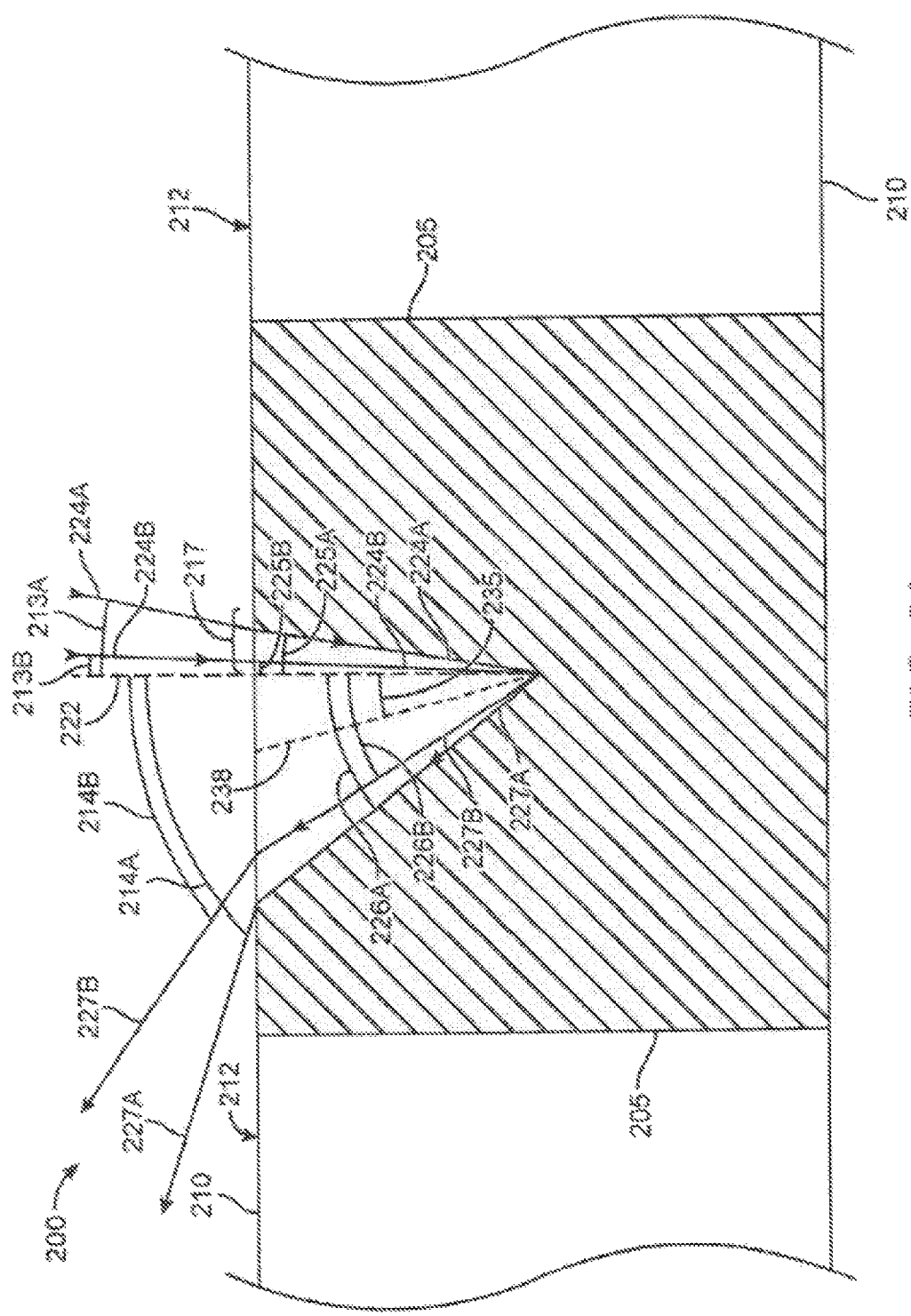
FIG. 2A is a cross-section view illustrating reflective properties of an illustrative skew mirror in accordance with some embodiments.
Figure 2B:
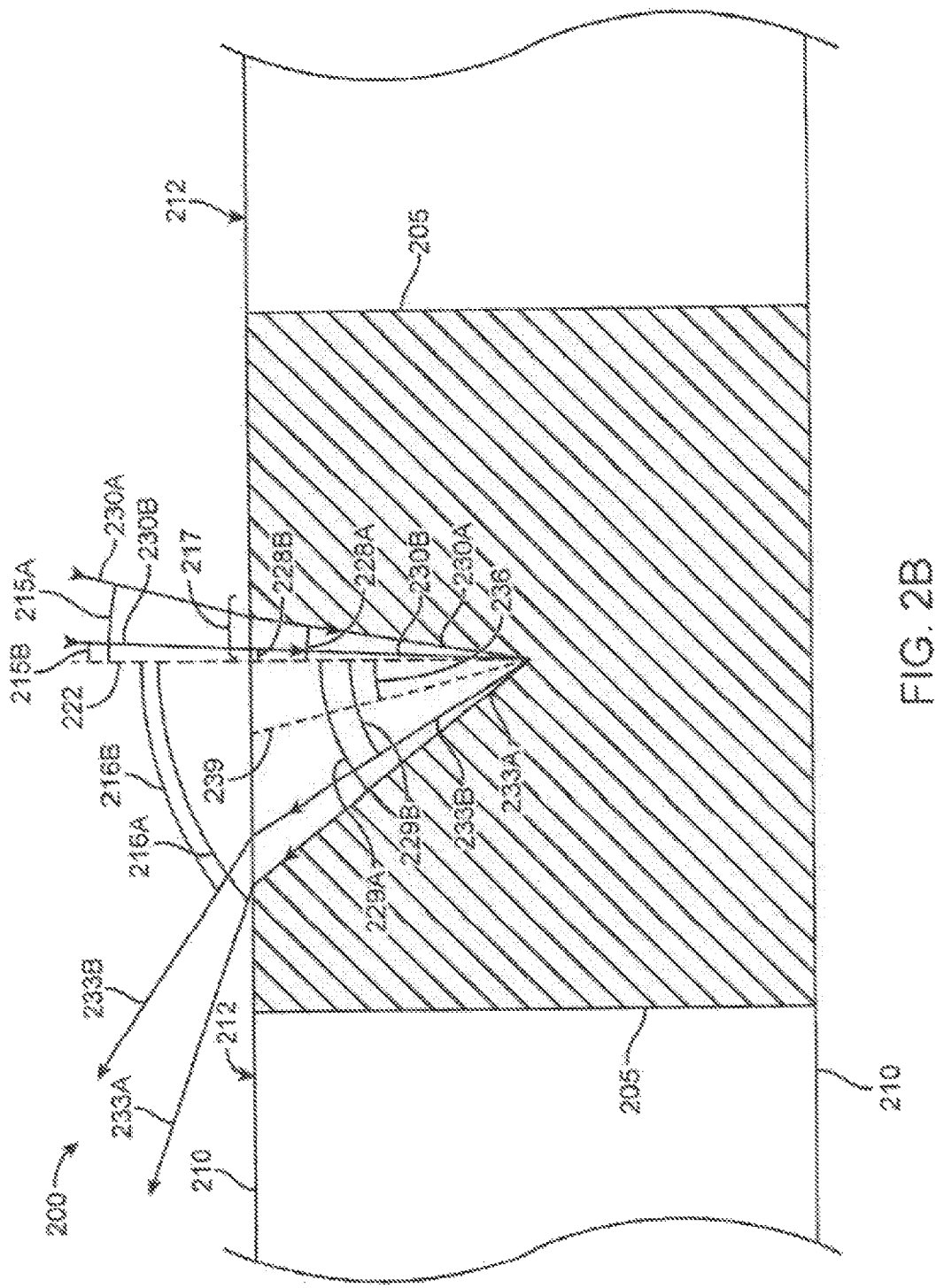
FIG. 2B is a cross-section view illustrating reflective properties of an illustrative skew mirror in accordance with some embodiments.

As a second example, a second embodiment skew mirror 200 is illustrated in FIGS. 2A and 2B. The second embodiment skew mirror 200 includes a grating structure 205 (shown by diagonal hatch lines in FIGS. 2A and 2B) residing in a grating medium 210. For purposes of clarity, the diagonal hatch lines are omitted in a region within the grating medium 210 proximate figure elements indicating light, axes, and angles. However, the grating structure 205 typically occupies the region described above. The grating structure 205 of the second embodiment includes multiple holograms that at least partially overlap with each other in the grating medium 210. The multiple holograms of the second embodiment comprise forty nine (49) volume holograms, recorded with recording beams having a wavelength of 405 nm. The 49 volume holograms overlap each other in the grating medium 210, and are recorded in a manner similar to the first embodiment skew mirror, except that recording beam internal angles of incidence are adjusted to account for media shrinkage. Recording the 49 holograms of the second embodiment skew mirror is described below in a second method of making a skew mirror.

The second embodiment grating medium 210 may be a photosensitive polymeric optical recording medium that is approximately 200 um thick, has an M/# of approximately 24, and a refractive index of approximately 1.50 for light having a wavelength of 405 nm. This medium may shrinks about 0.50% as a result of recording volume holograms.

Variations of the second embodiment skew mirror 200 may include an additional layer such as a glass cover or glass substrate (not shown in FIGS. 2A and 2B). The additional layer is typically refractive index matched to the grating medium, and a thin film of index matching fluid may reside between the grating medium 210 and the additional layer.

As best seen in FIG. 2A, the grating structure 205 of the second embodiment has the physical property of being configured to reflect a first incident light 224A, 224B, about a first reflective axis 238 (shown in broken line). The first incident light of the second embodiment consists essentially of a collimated, monochromatic light beam. The first incident light furthermore includes a first wavelength of 532 nm and is incident upon the grating medium 210 at a specific site 217. The first reflective axis 238 differs from surface normal 222 of the grating medium by a first reflective axis angle 235 of +14.618 degrees (internal) relative to surface normal, where the first incident light has a first internal angle of incidence 225A, 225B, relative to surface normal, residing between −9.281 degrees to −2.665 degrees, inclusive (a range of 6.616 degrees). The first internal angle of incidence includes one hundred one (101) different internal angles spaced at angle intervals of approximately 0.066 degrees, from −9.281 degrees to −2.665 degrees. In some variations of the second embodiment skew mirror, the first internal angles of incidence for the first incident light include ten (10) different internal angles spaced at angle intervals of about 0.66 degrees, from −9.281 degrees to −2.665 degrees. These angles are merely illustrative and non-limiting.

As shown FIG. 2A, first incident light 224A, having a first internal angle of incidence 225A of −9.281 degrees relative to surface normal, is reflected by the grating structure 205 as first reflected light 227A, having a first internal angle of reflectance 226A of +38.610 degrees relative to surface normal. First incident light 224B, having a first internal angle of incidence 225B relative to surface normal of −2.665 degrees, is reflected as first reflected light 227B having a first internal angle of reflectance 226B of +31.836 degrees. First reflected light 224A, 224B has the first wavelength, i.e. in the second embodiment the first reflected light has a wavelength of 532 nm.

As best seen in FIG. 2B, the grating structure 205 of the second embodiment is further configured to reflect second incident light 230A, 230B about a second reflective axis 239. The second incident light of the second embodiment consists essentially of a collimated, monochromatic, light beam. The second incident light furthermore includes a second wavelength of 513 nm, and the second wavelength therefore differs from the first wavelength by 19 nm, or a wave fraction (WF) of 0.036. The second incident light is incident upon the grating medium 210 at the specific site 217. The specific site 217 of the second embodiment includes an area of the grating medium surface 212 upon which both the first and second incident light shine. The second reflective axis 239 differs from surface normal 222 of the grating medium by a second reflective axis angle 236 of +14.617 degrees (internal) relative to surface normal, where the second incident light has a second internal angle of incidence 228A, 228B relative to surface normal, spanning a range of −9.281 degrees to −2.665 degrees. The second internal angle of incidence of the second incident light includes one hundred one (101) different internal angles spaced at angle intervals of approximately 0.066 degrees, from −9.281 degrees to −2.665 degrees. In some variations of the second embodiment skew mirror, the second internal angles of incidence for the second incident light include ten (10) different internal angles spaced at angle intervals of about 0.66 degrees, from −9.281 degrees to −2.665 degrees.

As shown in FIG. 2B, second incident light 230A, having a second internal angle incidence 228A of −9.281 degrees relative to surface normal, is reflected by the grating structure 205 as second reflected light 233A, having a second internal angle of reflectance 229A of +38.598 degrees relative to surface normal. Second incident light 230B, having a second internal angle of incidence 228B relative to surface normal of −2.655 degrees, is reflected as second reflected light 233B having a second internal angle of reflectance 229B of +31.836 degrees. Second reflected light 233A, 233B has the second wavelength, e.g., in the second embodiment the second reflected light has a wavelength of 513 nm.

For clarity, light in FIGS. 2A and 2B is illustrated as being reflected at a point residing proximate a center of the grating structure 205. However, light is typically reflected throughout the grating structure rather than at a specific point. In the second embodiment, the second reflective axis angle differs from the first reflective axis angle by approximately 0.0005 degree across WF=0.036. This very low level of change can approach the level of precision of instrumentation used to measure reflection angles. Accordingly, the second reflective axis can be said to not differ from the first reflective axis. For some applications, the difference between reflective axis angles should be 0.025 degree or less. For some other applications, the difference between reflective axis angles should be 0.010 degree or less across WF≥0.036. The second embodiment skew mirror meets these requirements. A Student's t-test (two-tailed) indicates no difference between the first reflective axis angle and the second reflective axis angle (N=101 per group; P=0.873). Moreover, a difference of 0.001 degree or less challenges the precision of instrumentation used to measure skew mirror reflection angles. Accordingly, for purposes of the present invention, where a second reflective axis differs from a first reflective axis by 0.001 degree or less, the second reflective axis can be said to not differ from the first reflective axis.

For the second embodiment skew mirror, angles of incidence of the first incident light vary from −17.250 degrees to −23.946 degrees relative to the first reflective axis. Angles of incidence of the second incident light relative to the second reflective axis vary from −17.250 degrees to −23.940 degrees. Thus it can be said that each of the first incident light and second incident light is offset from the first reflective axis by at least 17.20 degrees. This is merely illustrative and non-limiting.

Second embodiment external angles relative to surface normal for incident light and its reflection are also illustrated in FIGS. 2A and 2B. As seen in FIG. 2A, external angles relative to surface normal for first incident light 224A, 224B ranges from first incident light external angle 213A of −14.000 degrees to first incident light external angle 213B of −4.000 degrees. As seen in FIG. 2A, external angles relative to surface normal for second incident light 230A, 230B ranges from second incident light external angle 215A of −14.000 to second incident light external angle 215B of −4.000 degrees. First reflected light external angles 214A, 214B and second reflected light external angles 216A, 216B are also illustrated in FIGS. 2A and 2B, respectively.

Incident light and its reflection can typically be reversed, such that what was previously an angle of reflection becomes and angle of incidence, and vice versa. However, recitation or description of incidence angles herein refers only to those incidence angles being oriented to one side of the incidence angles' reflective axes, or, in the case of retro-reflected incident light, an incidence angle of zero (0) relative to the reflective axis. Accordingly, a range of incidence angles does not include angles that are both positive and negative with respect to the reflective axes. As illustrated and described here, incidence angles are negative (i.e. in a clockwise direction) with respect to the incident lights' reflective axes. However, this convention is used for convenience and simplicity and is not meant to teach, suggest, or imply that a skew mirror can only reflect light residing to one side of a reflective axis. The example of FIGS. 2A and 2B is merely illustrative.

As a third example, a third embodiment skew mirror includes a grating structure residing in a grating medium, where the grating structure comprises twenty one (21) volume holograms that overlap each other in the grating medium. The third embodiment grating medium may be a photosensitive polymeric optical recording medium that is approximately 70 urn thick, and that shrinks by about 1.0% as a result of recording volume holograms. Accordingly, shrinkage compensation is typically employed when recording volume holograms in the third embodiment grating medium. Shrinkage compensation is described below in the method of making the third embodiment skew mirror.

Variations of the third embodiment skew mirror may include an additional layer such as a glass cover or glass substrate. The additional layer is typically refractive index matched to the grating medium, and a thin film of index matching fluid may reside between the third embodiment grating medium and the additional layer.

The grating structure of the third embodiment has the physical property of being configured to reflect a first incident light about a first reflective axis. The first incident light has a first wavelength of 532 nm and is incident upon the grating medium at a specific site. The first reflective axis differs from surface normal of the grating medium by a first reflective axis angle of +9.419 degrees (internal) relative to surface normal, where the first incident light has an internal angle, relative to surface normal, residing between −6.251 degrees and +0.334 degrees, inclusive (a range of 6.585 degrees). The internal angle of the first incident light includes multiple angles spanning a range of approximately 6.59 degrees, the multiple angles including one hundred (100) different internal angles spaced at angle intervals of approximately 0.067 degrees, from −6.251 degrees to +0.334 degrees.

Third embodiment first incident light having an internal angle of −6.251 degrees relative to surface normal, is reflected by the grating structure as first reflected light having an internal angle of +25.027 degrees relative to surface normal. First incident light having an internal angle relative to surface normal of +0.334 degrees is reflected as first reflected light having an internal angle of +18.487 degrees. First reflected light has the first wavelength, i.e. in the third embodiment the first reflected light has a wavelength of 532 nm.

The grating structure of the third embodiment is further configured to reflect second incident light about a second reflective axis. The second incident light has a second wavelength of 513 nm, and the second wavelength therefor differs from the first wavelength by 19 nm, or a wave fraction (WF) of 0.036. The second incident light is incident upon the grating medium at the specific site. The second reflective axis differs from surface normal of the grating medium by a second reflective axis angle of +9.400 degrees (internal) relative to surface normal, where the second incident light has in internal angle, relative to surface normal, sparming a range from −6.251 degrees to +0.334 degrees. The internal angle of the second incident light includes one hundred (100) different internal angles spaced at angle intervals of approximately 0.067 degrees, from −6.251 degrees to +0.334 degrees.

Third embodiment second incident light, having an internal angle of −6.251 degrees relative to surface normal, is reflected by the grating structure as second reflected light, having an internal angle of +24.967 degrees relative to surface normal. Second incident light having an internal angle relative to surface normal of +0.334 degrees is reflected as second reflected light having an internal angle of +18.425 degrees. Second reflected light has the second wavelength, i.e. in the third embodiment the second reflected light has a wavelength of 513 nm. The second reflective axis of the third embodiment is substantially coincident with the first reflective axis.

Tables 1 includes a summary of reflective properties of first, second, and third embodiment skew mirrors.

TABLE 1

DIFFERENCE BETWEEN REFLECTIVE AXIS
ANGLES AT λ = 532 nm AND λ = 513 nm

|  | FIRST EMBODIMENT SKEW MIRROR (AK174-200 recording medium) N = 100 measurements | SECOND EMBODIMENT SKEW MIRROR (AK233-200 recording medium) N = 101 measurements | THIRD EMBODIMENT SKEW MIRROR (BAYFOL ® HX recording medium) N = 100 measurements |
|---|---|---|---|
| Mean reflective axis INTERNAL angle at λ = 532 nm * | 13.693° | 14.617° | 9.400° |
| Mean reflective axis INTERNAL angle at λ = 513 nm * | 13.759° | 14.618° | 9.419° |
| Difference between reflective axis INTERNAL angle at λ = 532 nm and at λ = 513 nm** | 0.066° | 0.0005° | 0.018° |
| Incident Light INTERNAL Angles *** | −4.660° to +1.933° (range = 6.593°) | −9.281° to −2.665° (range = 6.616°) | −6.251° to +0.334° (range = 6.58520) |
| Mean reflective axis EXTERNAL angle at λ = 532 nm * | 22.234° | 25.594° | 14.720° |
| Mean reflective axis EXTERNAL angle at λ = 513 nm * | 22.110° | 25.593° | 14.690° |
| Difference between reflective axis EXTERNAL angle at λ = 532 nm and at λ = 513 nm** | 0.124° | 0.0005° | 0.030° |
| Incident Light EXTERNAL Angles *** | −7.000° to 2.900° | −14.000° to −4.000° | −9.400° to +0.501° |

* mean angles are relative to surface normal, and are the means of N measurements at N incident light angles of incidence; both incident and reflected light have the specified wavelength (λ).
**differences between mean reflective axis angles at λ = 532 nm and at λ = 513 nm are absolute values and thus excludes negative numbers.
*** incident light angles of incidence, relative to surface normal.

These examples are merely illustrative and, in general, the skew mirrors described herein may have other properties. In general, the skew mirror, sometimes be referred to herein as volume holographic grating structure, may have physical properties (by virtue of the grating structures or holograms therein) that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Each grating structure (e.g., each volume hologram) in the skew mirror may reflect light in a manner different from another grating structure in the skew mirror. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be super-imposed within the grating medium of the skew mirror. The skew mirror may have a substantially constant (uniform) reflective axis (e.g., each grating structure of the skew mirror has a same substantially constant reflective axis).

Figure 3:
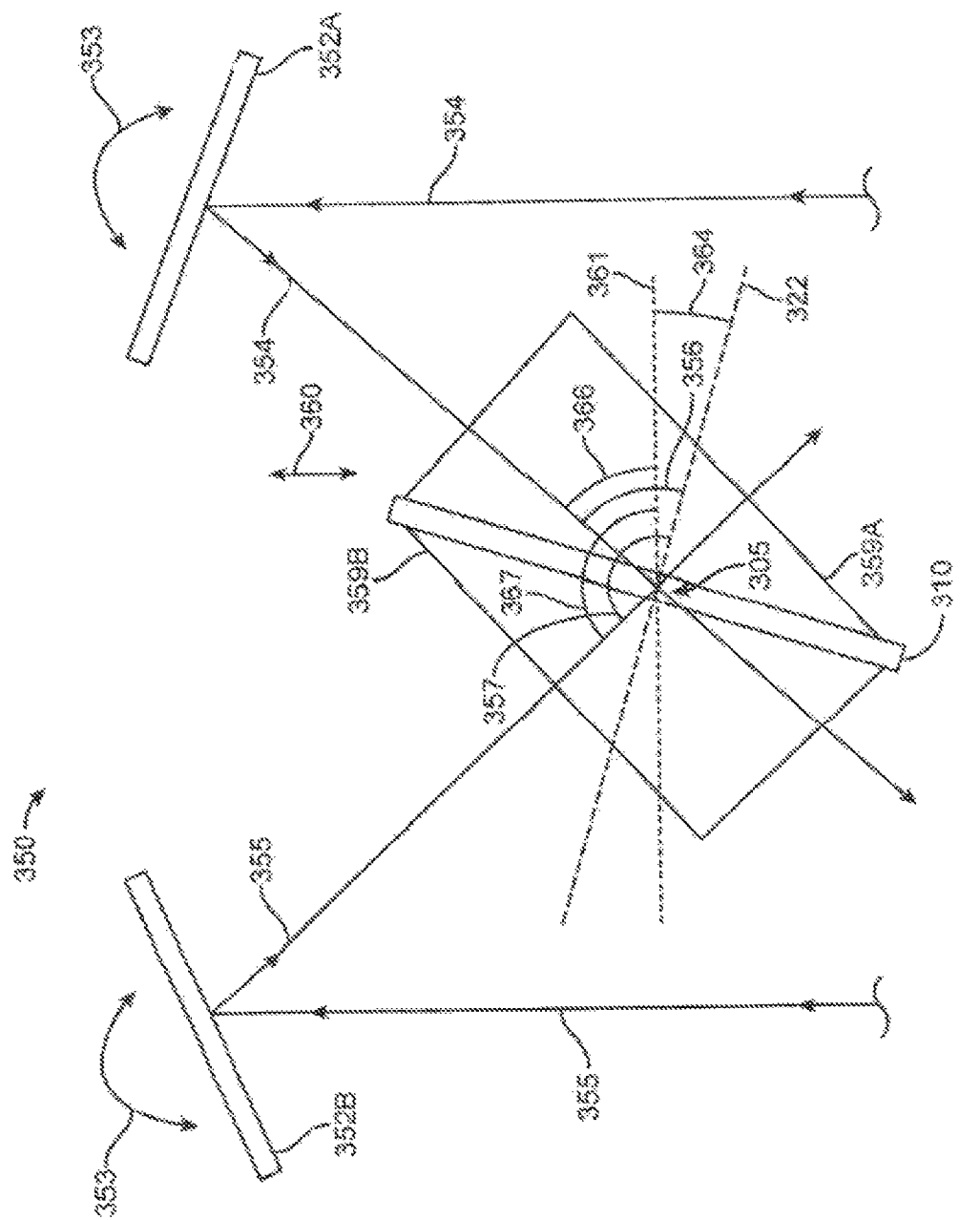
FIG. 3 is a cross-section view of an illustrative system for making an illustrative skew mirror, in accordance with some embodiments.

An exemplary system 350 for making a skew mirror is illustrated in FIG. 3. The exemplary system 350 includes a grating medium 310 disposed between a first mirror 352A and a second mirror 352B. The first and second mirrors are arranged to direct a first recording beam 354 and a second recording beam 355 such that the recording beams intersect and interfere with each other to form an interference pattern that is recorded as a hologram 305 in the grating medium 310. The hologram 305 is an example of a grating structure.

The recording beams may sometimes be referred to as a reference beam and a signal beam. However, each of the first and second recording beams are typically monochromatic collimated plane wave beams that are identical to each other (except for angles at which they are incident upon the grating medium). Moreover, the so-called signal beam typically includes no data encoded therein that is not also present in the so-called reference beam. Thus designation of one recording beam as a signal beam and the other recording beam as a reference beam can be arbitrary, with the designation of "signal" and "reference" serving to distinguish between the two recording beams, rather than to indicate that the one recording beam includes encoded data not present in the other recording beam. In some embodiments the recording beams may have widths that differ from each other.

The grating medium 310 is typically secured in place between a first prism 359A and second prism 359B using a fluid index matched to both the prisms and the grating medium. A skew axis 361 resides at a skew angle 364 relative to surface normal 322. The first and second recording beams 354, 355 reside at a first recording beam internal angle 356 and a second recording beam internal angle 357, respectively, relative surface normal 322. As can be seen in FIG. 3, the first and second recording beams 354, 355 are symmetrical about the skew axis 361 such that the first recording beam internal angle relative to the skew axis 366 is equal to 180° minus the second recording beam internal angle relative to the skew axis 367. The internal angles of the first and second recording beams relative to the skew axis 366, 367 are readily calculated from the first and second recording beam internal angles 356, 357, respectively, and the skew angle 364.

Each of the first and second recording beams are typically collimated plane wave beams originating from a laser light source. The plane wave beams may be illustrated using multiple light ray depictions for each recording beam. For clarity however, in FIG. 3 the first and second recording beams are illustrated using a single light ray depiction for each recording beam.

Refraction at air/prism boundaries, for example where the first recording beam 354 intersects an air/prism boundary of the first prism 359A and where the second recording beam 355 intersects an air/prism boundary of the second prism 359B, is shown figuratively rather than strictly quantitatively in FIG. 3. Because the prisms are typically index matched to the grating medium 310, refraction at the prism/grating medium boundary can usually be ignored. In embodiments, the grating medium and prisms each have an index of refraction of approximately 1.50.

For purposes of the present invention, a skew angle can be substantially identical to a reflective axis angle, meaning the skew angle is within 1.0 degree of the reflective axis angle. The skew axis angle and reflective axis angle can theoretically be identical. However, due to limits in system precision and accuracy, shrinkage of recording medium that occurs during recording holograms, and other sources of measurement error, the skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. A skew axis/reflective axis is generally called a skew axis when referring to making a skew mirror (for example when describing recording a hologram in a skew mirror grating structure), and as a reflective axis when referring to light reflective properties of a skew mirror.

Angles at which the first and second recording beams 354, 355 are incident upon the grating medium are adjusted by rotating the first and second beam mirrors, 352A, 352B, respectively. Rotation of the beam mirrors, indicated by rotation arrows 353, not only adjusts incidence angles, but also would change where the recording beams intersect the grating medium 310. Accordingly, the grating medium 310 and prisms 359A, 359B are moved translationally in order to record holograms at approximately the same location in the grating medium. Translation of the grating medium 310 is indicated by translation arrow 360.

In a variation of the exemplary system 350, a variable wavelength laser is used to vary the wavelength of the first and second recording beams. Incidence angles of the first and second recording beams may be, but are not necessarily, held constant while the wavelength of the first and second recording beams is changed.

Figure 4:
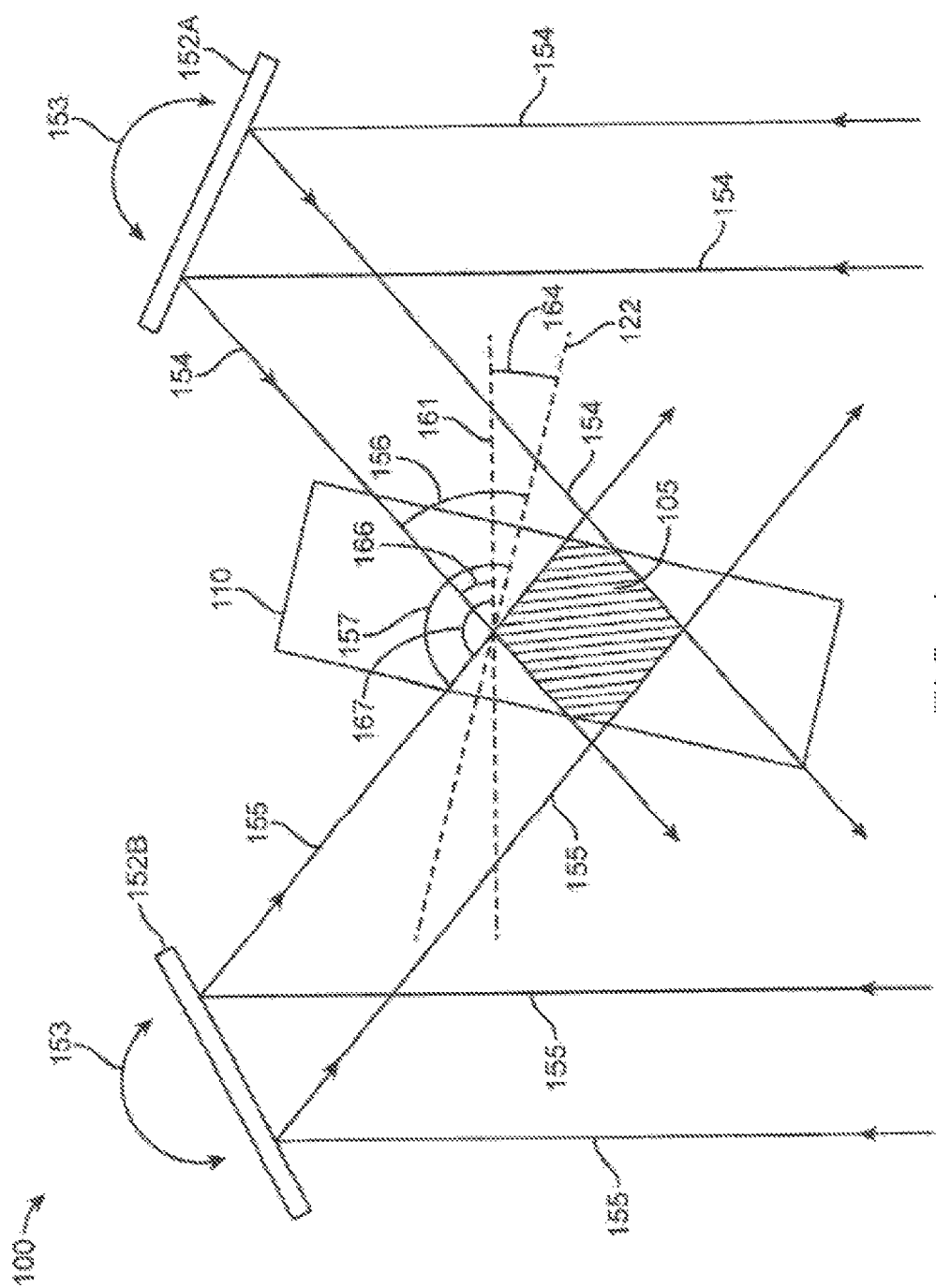
FIG. 4 is a cross-section view illustrating an illustrative method of making an illustrative skew mirror, in accordance with some embodiments.

A first method of making a skew mirror is illustrated in FIG. 4. In the example of FIG. 4, the skew mirror of the first method is the first embodiment skew mirror 100, which is also illustrated in FIGS. 1A and 1B, and whose physical properties are described above. The first method typically utilizes a system for making a skew mirror such as the exemplary system 350 illustrated in FIG. 3 and described above. For clarity however, in FIG. 4 first and second prisms are omitted, and recording beams are illustrated without showing refraction at air/grating medium boundaries or air/prism boundaries. However, refraction typically occurs at an air/prism boundary (or air/grating medium boundary, where index matched prisms are not used), and should be accounted for when designing a system or method to achieve the internal angles described.

A first recording beam 154 and a second recording beam 155 are directed at the first embodiment grating medium 110, where the recording beams interfere with each other to create an interference pattern, which is recorded as a volume hologram in the grating medium 110. The recording beams are typically created by splitting a 405 nm light beam (or light of other wavelengths) from an external cavity, tunable diode laser into two separate beams. The light beam is split using a polarizing beam splitter, and a half wave plate is used to alter polarity of one of the two separate beams from p-polarized to s-polarized, such that both of the two separate beams are s-polarized. One of the s-polarized beams becomes the first recording beam 154 and the other of the s-polarized beams becomes the second recording beam 155. Each of the first and second recording beams is a collimated, plane wave beam having a wavelength of 405 nm.

The first embodiment skew mirror benefits from having reflective properties that allow it to reflect light at a substantially different wavelength, and in particular a considerably longer wavelength, than the recording beam wavelength. The grating medium of the first embodiment skew mirror, in which first embodiment holograms are recorded with 405 nm wavelength recording beams, absorbs 405 nm light at approximately 0.07 absorbance units for the 200 um thick medium, for example. Conversely, the grating medium has negligible absorbance for visible wavelengths of light greater than 425 nm (conservatively estimated at less than 0.002 absorbance units per 200 um; the negligible absorbance is typically indistinguishable from zero). Thus the grating medium absorbs recording beam light (at 405 nm) at least 35 times more strongly than green light (for example, in a range of 503 nm to 537 nm) the first embodiment skew mirror is configured to reflect.

The grating structure 105 of the first embodiment skew mirror 100 is created by recording 48 volume holograms in the grating medium 110. Each of the 48 holograms is recorded at its own unique first recording beam internal angle 156 and its own unique second recording beam internal angle 157. The first recording beam internal angle 156 is an internal angle of the first recording beam 154 relative to surface normal 122 of the grating medium 110 and the second recording beam internal angle 157 is an internal angle of the second recording beam 155 relative to surface normal 122. Each of the first and second recording beams for the first embodiment skew mirror has irradiance of approximately 3 mW/cm². Typically, the first of the 48 holograms is recorded with an energy dose of 35 mJ/cm², and the dose is increased by about 1.5% for each subsequent hologram. The total energy dose for recording all 48 holograms is typically about 2.5 J/cm². Irradiance and energy doses described here are merely exemplary. Other embodiments of skew mirrors and methods of making skew mirrors may use different levels of irradiance and energy dose.

A first hologram is recorded using a first recording beam internal angle 156 of +53.218 degrees and a second recording beam internal angle 157 of +154.234 degrees. The skew axis 164 has a skew angle 164 of +13.726 degrees relative to surface normal 122. For each subsequent hologram of the grating structure, the first and second recording beam internal angles 156, 157 are typically changed by amounts that are approximately equal in magnitude to each other, but having opposite signs. For example, for a second hologram, the first recording beam internal angle is changed by +0.091 degree and the second recording beam internal angle is adjusted by −0.091 degree, such that the first recording beam internal angle 156 becomes +53.309 degrees and the second recording beam internal angle+154.143 degrees. The magnitudes of changes in recording beam internal angles from one hologram to the next hologram vary slightly across the 48 volume holograms (i.e. the change in change in recording beam internal angles from one hologram to the next varies), from 0.091 degree for changes in recording beam internal angles from the first hologram to the second hologram, to 0.084 degree for changes in recording beam internal angles from the 47$^{th}$ hologram to the 48$^{th}$ hologram. However, for each change of first and second recording beam internal angles, the magnitude of change is the same and the sign is opposite for each of the first and second beam angles. The first and second recording beam internal angles 156, 157 for the last (48$^{th}$) hologram of the first embodiment grating structure 105 are +57.332 and +150.120 degrees, respectively. In some embodiments, the magnitude of change of the first recording beam internal angle may differ very slightly from the magnitude of change of the second recording beam internal angle in order to compensate for system imprecision, for Snell effects, for dispersion, or for shrinkage of the grating medium that results from recording the holograms.

The first recording beam internal angle 156 ranges from +53.218 to +57.332 degrees (a range of 4.114 degrees) and the second recording beam internal angle 157 ranges from +154.234 to +150.120 degrees (a range of 4.114 degrees). As can be seen in FIG. 4, the first and second recording beams 154, 155 are symmetrical about the skew axis 161 such that the internal angle of the first recording beam relative to the skew axis 166 (+38.492 degrees for the first hologram) is equal to 180° minus the internal angle of the second recording beam relative to the skew axis 167 (+141.508 degrees for the first hologram) (180°-+141.508°=38.492 degrees). The internal angles of the first and second recording beams relative to the skew axis 166, 167 are readily calculated from the first and second recording beam internal angles 156, 157, respectively, and the skew angle 164. After recording the 48 volume holograms, the recording medium is light cured.

In a variation of the first method of making a skew mirror, a hologram is created by continuously and synchronously adjusting the first and second recording beam internal angles while maintaining the symmetry of the first and second recording beams about the skew axis as described above. Accordingly, a single hologram is recorded while the first recording beam is scanned from a first recording beam internal angle of +53.218 degrees to a first recording beam angle of +57.332 degrees. Simultaneously, the second recording beam is scanned from a second recording beam internal angle of +154.234 degrees to +150.120 degrees. The single hologram is thus equivalent to the 48 discrete holograms recorded with 48 sets of unique first recording beam and second recording beam internal angles, and the total energy dose for recording the single hologram is typically about the same (2.5 J/cm²) as for the 48 holograms.

These examples are merely illustrative and, in general, similar recording methods may be used to manufacture any desired skew mirrors. For example, a second method of making a skew mirror is described below as an illustrative example. The skew mirror of the second method is the second embodiment skew mirror 200, which is also illustrated in FIGS. 2A and 2B, and whose physical properties are described above.

The second method is identical to the first method except that first and second recording beam internal angles are different than with the first method, and the grating medium also differs from the first method. Like the first embodiment, the second embodiment skew mirror benefits from having reflective properties that allow it to reflect light at a substantially different wavelength, and in particular a considerably longer wavelength, than the recording beam wavelength.

The grating structure 205 of the second embodiment skew mirror 200 is created by recording 49 volume holograms in the grating medium 210. Each of the 49 holograms of the second method is recorded at its own unique first recording beam internal angle and its own unique second recording beam internal angle. The first recording beam internal angle is an internal angle of the first recording beam relative to surface normal of the grating medium and the second recording beam internal angle is an internal angle of the second recording beam relative to surface normal. Each of the first and second recording beams for the first embodiment skew mirror has irradiance of approximately 3 mW/cm². Typically, the first of the 49 holograms are recorded with an energy dose of 35 mJ/cm², and the dose is increased by about 1.5% for each subsequent hologram. The total dose for recording all 49 holograms is typically about 2.5 J/cm².

According to the second method, a first hologram is recorded using a first recording beam internal angle of +55.913 degrees and a second recording beam internal angle of +153.323 degrees. The skew axis has a skew angle of +14.618 degrees relative to surface normal. For each subsequent hologram of the grating structure, the first and second recording beam internal angles are typically changed by amounts that are approximately equal in magnitude to each other, but having opposite signs. For example, for recording a second hologram according to the second method, the first recording beam internal angle is changed by +0.095 degree and the second recording beam internal angle is adjusted by −0.095 degree, such that the first recording beam internal angle becomes +56.008 degrees and the second recording beam internal angle +153.228 degrees. The magnitudes of changes in recording beam internal angles from one hologram to the next hologram typically vary slightly across the 49 volume holograms (i.e. the change in change in recording beam internal angles from one hologram to the next varies), from a magnitude of 0.095 degree for changes in recording beam internal angles from the first hologram to the second hologram, to a magnitude of 0.087 degree for changes in recording beam internal angles from the 48$^{th}$ hologram to the 49$^{th}$ hologram. However, the magnitude of change is the same for each of the first and second recording beam internal angles, and the sign of the change is opposite for each of the first and second recording beam internal angles. The first and second recording beam internal angles for the last (49$^{th}$) hologram of the second embodiment grating structure are +60.252 and +148.984 degrees, respectively. In some embodiments, the magnitude of change of the first recording beam internal angle may differ very slightly from the magnitude of change of the second recording beam internal angle in order to compensate for factors such as system imprecision, Snell effects, dispersion, or shrinkage of the grating medium that results from recording the holograms.

Thus according to the second method the first recording beam internal angle ranges from +55.913 to +60.252 degrees (a range of 4.339 degrees) and the second recording beam internal angle ranges from +153.323 to +148.984 degrees (a range of 4.339 degrees). As with the first method, the first and second recording beams of the second method are symmetrical about the skew axis such that the internal angle of the first recording beam relative to the skew axis (+41.295 degrees for the first hologram) is equal to 180° minus the internal angle of the second recording beam relative to the skew axis (+138.705 for the first hologram) (180°−+138.705°=+41.295 degrees). According to the second method, the internal angles of the first and second recording beams relative to the skew axis are readily calculated from the first and second recording beam internal angles respectively, and the skew angle. After recording the 49 volume holograms, the recording medium is light cured.

In a variation of the second method of making a skew mirror, a hologram is created by continuously and synchronously adjusting the first and second recording beam internal angles while maintaining the symmetry of the first and second recording beams about the skew axis as described above. Accordingly, a single hologram is recorded while the first recording beam is scanned from a first recording beam internal angle of +55.913 degrees to a first recording beam angle of +60.252 degrees. Simultaneously, the second recording beam is scanned from a second recording beam internal angle of +153.323 degrees to +148.984 degrees. The single hologram is thus equivalent to the 49 discrete holograms recorded with 49 sets of unique first recording beam and second recording beam internal angles. The total energy dose for recording the single hologram is typically 2.5 J/cm$^2$ for the single hologram. These examples are merely illustrative and, in general, similar recording methods may be used to manufacture any desired skew mirrors.

As another example, in a multi-wavelength method of making a skew mirror, six volume holograms may be recorded in a grating medium, with each of the six holograms being recorded using its own unique first and second recording beam internal angles of incidence. In addition, for each of the six volume holograms, wavelengths of the first and second recording beams are adjusted continuously and synchronously from 403 nm to 408 nm, using a variable wavelength laser. Wavelengths of the first and second recording beams are kept equal to each other while recording each of the six volume holograms. Total energy dose delivered in recording the six volume holograms according to the multi-wavelength method is typically, but not necessarily, 2.5 J/cm$^2$ for first and second recording beam internal angles of incidence for the multi-wavelength method of making a skew mirror are provided below in Table 2. A skew mirror made by the multi-wavelength method has the same reflective characteristics of the second embodiment skew mirror described above.

TABLE 2

RECORDING BEAM ANGLES FOR A MULTIWAVELENGTH METHOD OF MAKING A SKEW MIRROR

| HOLOGRAM | First Recording Beam Angle of Incidence* | Second Recording Beam Angle of Incidence* |
|---|---|---|
| 1 | 56.235° | 153.001° |
| 2 | 57.033° | 152.203° |
| 3 | 57.813° | 151.423° |
| 4 | 58.568° | 150.668° |
| 5 | 59.303° | 149.933° |
| 6 | 60.018° | 149.218° |

*internal, relative to grating medium surface normal

These examples are merely illustrative and, in general, similar recording methods may be used to manufacture any desired skew mirrors (e.g., having any desired number of holograms for diffracting input light at particular incident angles and wavelengths in particular directions, e.g., with a substantially constant reflective axis). Embodiments of a skew mirror can be created in a grating medium including a volumetric dielectric medium, such as a photosensitive recording medium. Skew mirror embodiments may be formed by constraining a spatial dielectric modulation spectrum as described herein. In an embodiment, dielectric modulation is accomplished holographically by recording an interference pattern of two or more coherent light beams in a photosensitive recording medium. In other embodiments, dielectric modulation can be accomplished by other means.

The k-space formalism is a method for analyzing holographic recording and diffraction [1]. In k-space, propagating optical waves and holograms are represented by three dimensional Fourier transforms of their distributions in real space. For example, an infinite collimated monochromatic reference beam can be represented in real space and k-space by equation (1), $$E_r(\vec{r}) = A_r \exp(i\, \vec{k}_r \cdot \vec{r}) \;\overset{\mathcal{F}}{\rightarrow}\; E_r(\vec{k}) = A_r\, \delta(\vec{k} - \vec{k}_r), \tag{1}$$

where $E_r(\vec{r})$ is the optical scalar field distribution at all $\vec{r} = \{x,y,z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some embodiments, all beams are composed of light of the same wavelength, so all optical wave vectors must have the same length, i.e., $\vec{k}_r = k_n$. Thus, all optical propagation vectors must lie on a sphere of radius $k_n = 2\pi\, n_0/\lambda$, where $n_0$ is the average refractive index of the hologram ("bulk index"), and $\lambda$ is the vacuum wavelength of the light. This construct is known as the k-sphere. In other embodiments, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2), $$\Delta n(\vec{r}) \propto |E_1(\vec{r})+E_2(\vec{r})|^2 = |E_1(\vec{r})|^2+|E_2(\vec{r})|^2+E^*_1(\vec{r})E_2(\vec{r})+E_1(\vec{r})E^*_2(\vec{r}) \quad (2)$$

where $E_1(\vec{r})$ is the spatial distribution of the signal first recording beam field and $E_2(\vec{r})$ is the spatial distribution of the second recording beam field. The unary operator * denotes complex conjugation. The final term in equation (2), $E_1(\vec{r})E^*_2(\vec{r})$, maps the incident second recording beam into the diffracted first recording beam. Thus we can write equation (3), $$E_1(\vec{r})E^*_2(\vec{r}) \overset{\mathscr{F}}{\to} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

FIG. 5A illustrates a real space representation of recording a hologram 505 in a grating medium 510 using a second recording beam 515 and a first recording beam 514. The grating medium typically includes a recording layer configured to record interference patterns as holograms. FIG. 5A omits grating medium components other than the recording layer, such as an additional layer that might serve as a substrate or protective layer for the recording layer. The second recording beam 515 and first recording beam 514 are counter-propagating. Each of the second recording beam 515 and first recording beam 514 are typically plane wave beams having the same wavelength as each other, and the first recording beam 514 typically contains no information encoded therein that is not also present in the second recording beam. Thus the first and second recording beams, which can be referred to as signal and reference beams, are typically substantially identical to each other except for angles at which they are incident upon the recording medium 510.

FIG. 5B illustrates a k-space representation of the first and second recording beams, and the hologram. The hologram illustrated in FIGS. 5A and 5B is a simple Bragg reflection hologram generated with the counter-propagating first recording beam 514 and second recording beam 515, and recorded in recording medium 510. FIG. 5A shows the second recording beam 515 and the first recording beam 514 impinging on opposite sides of the grating medium 510. Optical scalar field distributions at all $\vec{r} = \{x, y, z\}$ 3D spatial vector locations for each of the second recording beam 515 and the first recording beam 514 can be represented as $E_2(\vec{r})$ and $E_1(\vec{r})$, respectively. The recording beams 514, 515 form planar interference fringes, which are recorded as a hologram 505 within the grating medium 510. The hologram 505 comprises a sinusoidal refractive index modulation pattern, and can be represented as $\Delta n(\vec{r})$. In a counter-propagating configuration, the recorded planar interference fringes have a spacing exactly half that of the (internal) wavelength of the light used to record the hologram.

FIG. 5B shows a k-space representation of the situation illustrated in real space by FIG. 5A. The recording beams are represented in FIG. 5B by point-like k-space distributions lying on opposite sides of the recording k-sphere 570. As illustrated in FIG. 5B, the second recording beam has a k-space distribution 562, and the first recording beam has a k-space distribution 563. The second recording beam k-space distribution 562 can be represented as $E_2(\vec{k})$ and the first recording beam k-space distribution 563 can be represented as $E_1(\vec{k})$. Each of the second recording beam k-space distribution 562 and the first recording beam k-space distribution 563 are "point-like." Second recording beam wave vector 564 and first recording beam wave vector 565, are shown extending from the origin to the second recording beam k-space distribution 562 and first recording beam k-space distribution 563, respectively. The second recording beam wave vector 564 can be represented as $E_2(\vec{k})$ and the first recording beam wave vector 565 can be represented as $E_1(\vec{k})$. The hologram itself is represented in FIG. 5B by two conjugate sideband k-space distributions 568, each of which can be represented as $\Delta n(\vec{k})$ and referred to as a $\Delta n(\vec{k})$ k-space distribution. The two $\Delta n(\vec{k})$ k-space distributions 568 have a small, finite size, but are "point-like" in the sense that they are typically several orders of magnitude smaller than their distance to the origin, or other features of FIG. 5B. For instance, if the thickness of grating medium 510 is 200 μm with refractive index 1.5 and the recording beams have a wavelength of 532 nm, then distributions 568 each resemble a sinc function along the $k_z$ dimension with size $3.14 \times 10^4$ rad/m null-to-null. However, their distance from the origin is $3.56 \times 10^7$ rad/m, which is more than 1000 times as large. Unless specified otherwise, all recited wavelengths refer to vacuum wavelengths.

Typically, the hologram constitutes a refractive index distribution that is real-valued in real space. Locations of the two $\Delta n(\vec{k})$ k-space distributions 568 of the hologram may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ are grating vectors from the respective hologram $\Delta n(\vec{k})$ k-space distributions to the origin (not shown individually). A combined grating vector 569, which can be represented as $\vec{K}_G$, comprising both $\vec{K}_{G+}$ and $\vec{K}_{G-}$ grating vectors, is shown in FIG. 5B as double headed arrow 569 extending between the second recording beam k-space distribution 562 and the first recording beam k-space distribution 563. Note that by convention, wave vectors are represented by a lowercase "k," and grating vectors by uppercase "K."

Once recorded, the hologram may be illuminated by a probe beam to produce a diffracted beam. For purposes of the present invention, the diffracted beam can be considered a reflection of the probe beam, which can be referred to as an incident light beam. The probe beam and its reflected beam are angularly bisected by a reflective axis (e.g. the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k})\big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator [1]. The notation "$\big|_{|\vec{k}|=k_n}$" indicates that the preceding expression is evaluated only where $|\vec{k}|=k_n$, i.e., where the result lies on the k-sphere. The convolution $\Delta_n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record the hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Figure 6B:
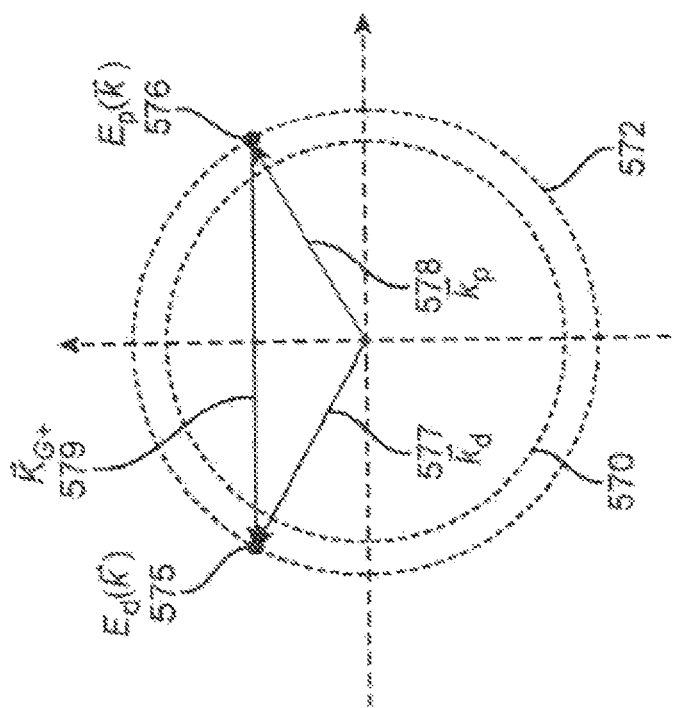
FIG. 6B cross-section view of a k-space representation of an illustrative single sinusoidal hologram in accordance with some embodiments.
Figure 6A:
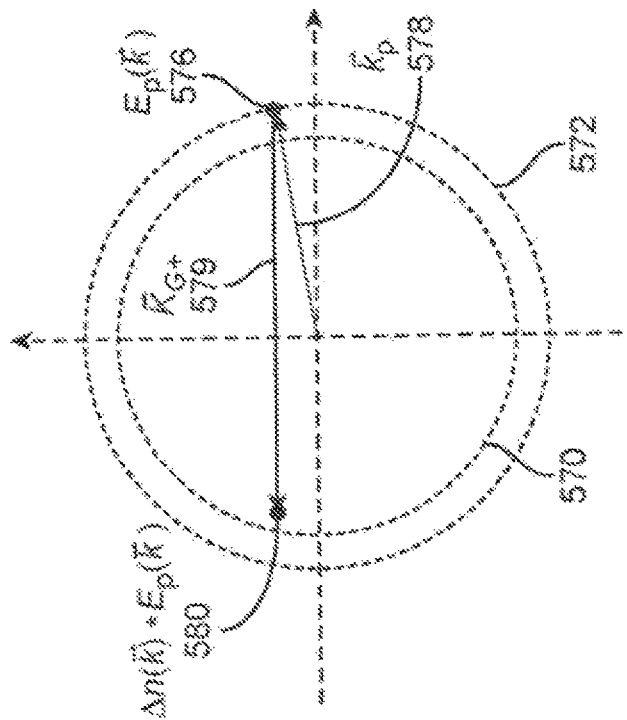
FIG. 6A is a cross-section view of a k-space representation of an illustrative single sinusoidal hologram in accordance with some embodiments.

FIGS. 6A and 6B illustrate cases of Bragg-matched and Bragg-mismatched reconstructions, respectively, generated by illuminating the hologram depicted in FIGS. 5A and 5B. In both the Bragg-matched and Bragg-mismatched cases, the hologram is illuminated with a probe beam having a shorter wavelength than the recording beams used to record the hologram. The shorter wavelength corresponds to a longer wave vector. Accordingly, a probe k-sphere 572 has a greater radius than that of the recording k-sphere 570. Both the probe k-sphere 572 and the recording k-sphere 570 are indicated in FIGS. 6A and 6B.

FIG. 6A shows a case where the probe beam is designed to produce a diffracted beam k-space distribution 575 (represented as $E_d(\vec{k})$) that is point-like and lies on the probe beam k-sphere 572. The diffracted beam k-space distribution 575 is produced according to the convolution of Equation (4). The probe beam has a k-space distribution 576 (represented as $E_p(\vec{k})$) that is also point-like. In this case, the probe beam is said to be "Bragg-matched" to the hologram, and the hologram may produce significant diffraction, even though the probe beam wavelength differs from the wavelength of the recording beams used to record the hologram. As best seen in FIG. 6A, the convolution operation may also be represented geometrically by the vector sum $\vec{k}_d = \vec{k}_p + \vec{K}_{G+}$, where $\vec{k}_d$ represents a diffracted beam wave vector 577, $\vec{k}_p$ represents a probe beam wave vector 578, and $\vec{K}_{G+}$ represents a sideband grating vector 579.

FIG. 6A shows a k-space representation of a mirror-like diffraction (which can be referred to as a reflection) of the probe beam by the hologram, where the probe beam angle of incidence with respect to the $k_z$ axis is equal to the diffracted beam angle of reflection with respect to the $k_z$ axis. FIG. 6B shows a k-space representation of a Bragg-mismatched case, wherein a k-space polarization density distribution 580, which can be represented as $\Delta n(\vec{k}) * E_p(\vec{k})$, does not lie on the probe k-sphere 572, and thus no significant diffraction of the probe beam occurs. This non-diffracted k-space distribution 580 in the Bragg-mismatched case illustrated in FIG. 6B is somewhat analogous to the diffracted beam k-space distribution 575 in the Bragg-matched case illustrated in FIG. 6A, but k-space distribution 580 should not be referred to as a diffracted beam k-space distribution because no significant diffraction of the probe beam occurs.

Comparing the Bragg-matched and Bragg-mismatched cases, it is evident that the hologram will only produce mirror-like diffraction over a very small range of input angles for a given probe wavelength, if at all. This range may be somewhat extended by over-modulating the hologram, or by using a very thin recording layer; but these steps may still not lead to mirror-like behavior over a larger range of wavelengths and angles.

FIGS. 5A, 5B, 6A, and 6B represent a reflection hologram constituted by a single sinusoidal grating. As illustrated, this hologram exhibits mirror-like reflectivity in a narrow band of wavelengths and incidence angles. Conversely, embodiments of the present disclosure exhibit novel mirror-like reflectivity across relatively broad ranges of wavelengths and angles by creating a more complex grating structure comprising multiple gratings.

Figure 7:
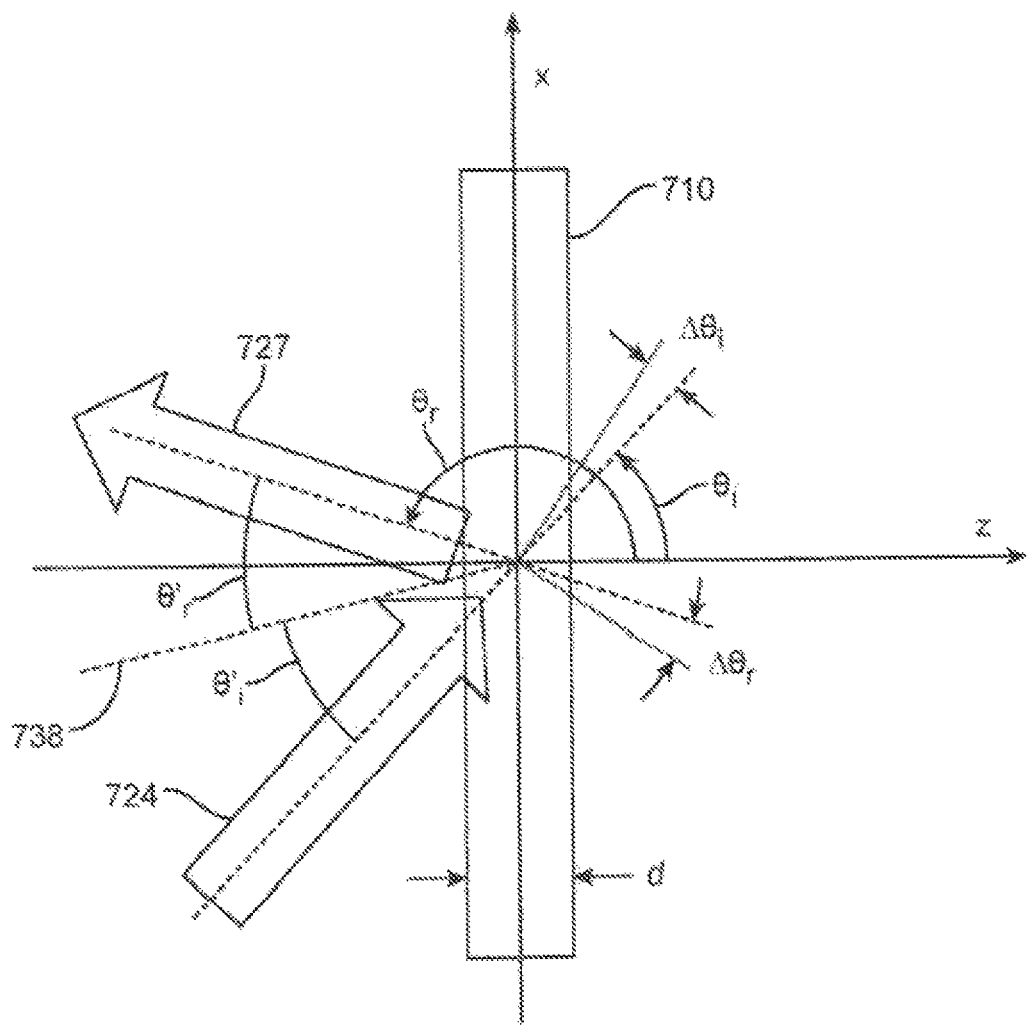
FIG. 7 is a cross-section real view illustrating reflective properties of an illustrative skew mirror in real space, in accordance with some embodiments.

FIG. 7 shows a geometry illustrating the Bragg selectivity of a single sinusoidal grating. Grating medium 710 contains a single sinusoidal grating of thickness d which reflects incident light 724 of a single wavelength, Xo, as principal reflected light 727. At the Bragg-matched condition, incident light 724 impinges at angle $\theta_i$, and reflects as reflected light 727 at angle $\theta_r$, both angles measured with respect to the z axis. Incident light 724 and reflected light 727 also define a reflective axis 738, about which the angular magnitudes of incidence $\theta_i'$ and reflection $\theta_r'$ are equal. Reflective axis 738 is thus an angular bisector of incident light 724 and reflected light 727.

The sinusoidal grating of FIG. 7 will exhibit both angular and wavelength Bragg selectivity. If incident light 724 impinges at non-Bragg-matched angle $\theta_i - \Delta\theta_i$, the diffraction efficiency may be diminished compared to the Bragg-matched diffraction efficiency. The selectivity of a sinusoidal grating may be characterized by its angular Bragg selectivity, $\Delta\theta_B$, given by equation (5):

$$\Delta\theta_B = \frac{\lambda \cos\theta_r}{n_0 \, d \, \sin(\theta_i - \theta_r)}. \quad (5)$$

In a weakly-diffracting sinusoidal grating, the angle $\theta_i + \Delta\theta_B$ represents the first null in the angular diffraction efficiency plot. The quantity $\Delta\theta_B$ can thus be said to represent the angular width of the sinusoidal grating in that diffraction can be greatly diminished when the angle of incidence deviates from the Bragg-matched angle $\theta_i$ by more than several times $\Delta\theta_B$. Similarly, for a weakly-diffracting sinusoidal grating, the skilled artisan would expect a reflective axis to vary considerably for monochromatic incident light whose angle of incidence varies by more than several times $\Delta\theta_B$.

Conversely, illustrative skew mirrors exhibit relatively stable diffraction and a substantially constant reflective axis angle for incident light whose angle of incidence varies by many times $\Delta\theta_B$. Some skew mirror embodiments exhibit a substantially constant reflective axis angle across a range of incident light angles of incidence of $20\times\Delta\theta_B$. In embodiments, reflective axis angles across a range of incident light angles of incidence of $20\times\Delta\theta_B$ change by less than 0.250 degree; or by less than 0.10 degree; or by less than 0.025 degree. As shown in Table 3 below, reflective axis angles across a range of incident light angles of incidence of $20\times\Delta\theta_B$ for the first and second embodiment skew mirrors described above change by less than 0.020 degree each of the first and second embodiment skew mirrors, at multiple wavelengths that differ from each other by WF≥0.036.

TABLE 3

CHANGE IN REFLECTIVE AXIS ANGLES ACROSS AN INCIDENCE ANGLE RANGE OF APPROXIMATELY 20 x $\Delta\theta_B$

| Skew Mirror Embodiment | λ * | Difference In reflective Axis Angles ** | Incident Light Angle Range *** | $\Delta\theta_B$† |
|---|---|---|---|---|
| FIRST EMBODIMENT SKEW MIRROR (AK174-200 recording medium) | 532 nm | 0.012° | −3.167° to +0.369° | 0.177° |
| | 513 nm | 0.012° | −3.111° to +0.313° | 0.171° |
| SECOND EMBODIMENT SKEW MIRROR (AK233-200 recording medium) | 532 nm | 0.019° | −7.246° to −4.726° | 0.126° |
| | 513 nm | 0.016° | −7.202° to −4.770° | 0.122° |

* wavelength of both incident and reflected light.
** difference in reflective axis angles (internal, relative to surface normal) for incident light having a change in angle of incidence of approximately 20 x $\Delta\theta_B$.
*** range of incident light angles of incidence (internal, relative to surface normal) approximately equal to 20 x $\Delta\theta_B$, for which the Difference In Reflective Axis Angles is reported in this table.
†$\Delta\theta_B$ is calculated for an incident light angle of incidence at the midpoint of the Incident Light Angle Range reported in this table.

Similarly, a sinusoidal grating may be characterized by its wavelength Bragg selectivity, $\Delta\lambda_B$, given by equation (6):

$$\Delta\lambda_B = \frac{\lambda_0^2 \cos\theta_r}{2n_0^2\, d\, \sin^2(\theta_i - \theta_r)}. \quad (6)$$

Those skilled in the art will recognize that in a weakly-diffracting sinusoidal grating, the wavelength $\lambda_0 + \Delta\lambda_B$ represents the first null in the wavelength diffraction efficiency plot. The quantity $\Delta\lambda_B$ can thus be said to represent the wavelength width of the sinusoidal grating in that no significant diffraction will occur when the incident wavelength deviates from the Bragg-matched wavelength $\lambda_0$ by more than several times $\Delta\lambda_B$. Equations (5) and (6) apply to changes in angle and wavelength only, respectively, and changing both angle and wavelength simultaneously may result in another Bragg-matched condition.

A grating may also be characterized by its diffracted angle response. For a sinusoidal grating, the diffracted angle response may be expressed by $$\Delta\theta_r \cos\theta_r = -\Delta\theta_i \cos\theta_i. \quad (7)$$

The diffracted angle response expresses the change in the angle of reflection, $\Delta\theta_r$, in response to small changes in the angle of incidence, $\Delta\theta_i$. In contrast, a true mirror has an angle response expressed by equation (8):

$$\Delta\theta_r = -\Delta\theta_i. \quad (8)$$

A device that has a diffracted angle response substantially characterized by Equation (7) may be said to exhibit grating-like reflective behavior, whereas a device that has a diffracted angle response substantially characterized by Equation (8) may be said to exhibit mirror-like reflective behavior. A device exhibiting grating-like reflective behavior will necessarily also exhibit a reflective axis that changes with angle of incidence, unless that reflective axis is normal to the device surface, in which case $\cos\theta_r = \cos\theta_i$. Accordingly, requirements for a relatively simple device that reflects light about a reflective axis not constrained to surface normal, and whose angle of reflection for angles of incidence spanning multiples of its angular Bragg selectivity is constant at wavelengths spanning multiples of its wavelength Bragg selectivity, may not be met by a single sinusoidal grating.

FIG. 7 illustrates a device geometry in a reflective configuration. However, the preceding analysis also applies to device geometries in transmissive configurations and to device geometries in which one or both beams are waveguided by total internal reflection within the device.

Figure 8A:
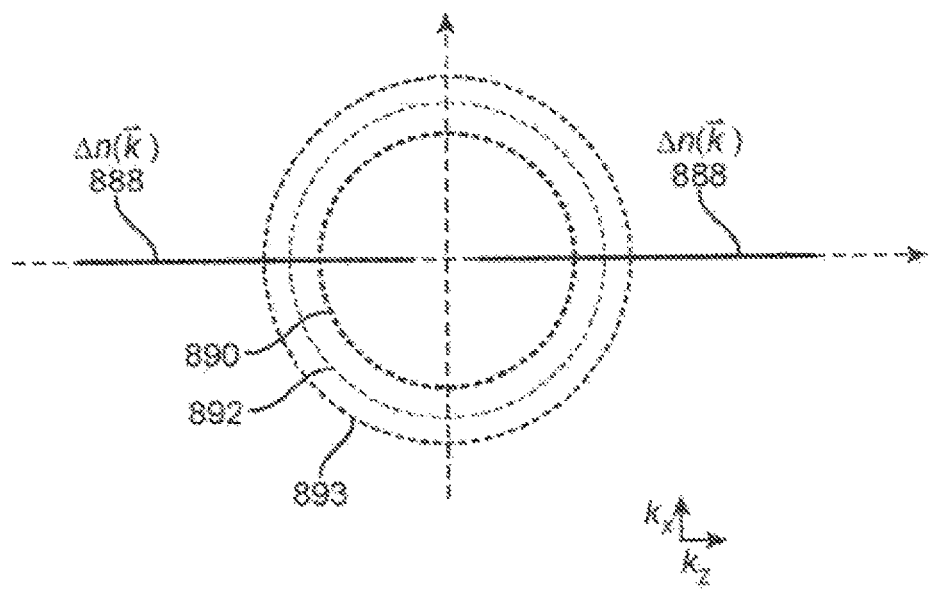
FIG. 8A is a cross-section view of a k-space representation of an illustrative skew mirror in accordance with some embodiments.
Figure 8B:
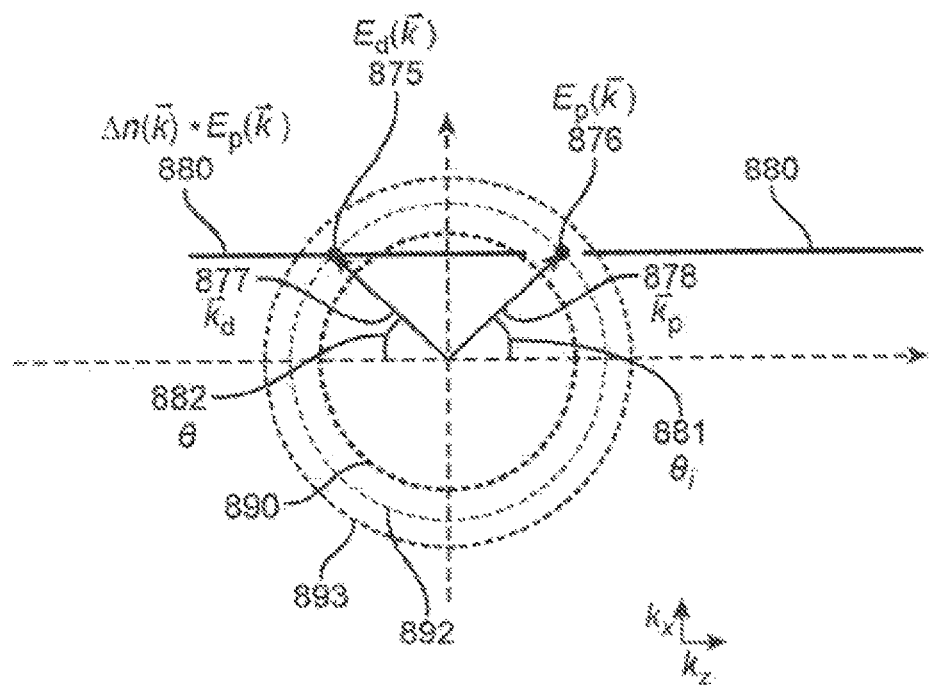
FIG. 8B is a cross-section view of a k-space representation of an illustrative skew mirror in accordance with some embodiments.

FIGS. 8A and 8B illustrate operation of a skew mirror in k-space according to an embodiment. FIG. 8A shows two $\Delta n(\vec{k})$ k-space distributions 888 for a hologram recorded in a grating medium and configured to produce multi-wavelength mirror-like diffraction according to an embodiment. As explained above with respect to a k-space representation of a prior art hologram shown in FIG. 5B, a $\Delta n(\vec{k})$ k-space distribution can be represented as $\Delta n(\vec{k})$. A red k-sphere 890, green k-sphere 892, and blue k-sphere 893 in FIGS. 8A and 8B indicate k-spheres corresponding to wavelengths of light residing in the red, green, and blue regions of the visible spectrum, respectively.

Instead of two $\Delta n(\vec{k})$ k-space distributions constituting a single sinusoidal grating (and which therefore can be characterized as "point-like"), the $\Delta n(\vec{k})$ k-space distributions 888 shown in FIG. 8A are situated along a substantially straight line in k-space, and thus can be characterized as "line segment-like". In some embodiments, line segment-like $\Delta n(\vec{k})$ k-space distributions comprise continuously-modulated sub-segments of a substantially straight line in k-space. In some embodiments, line segment-like $\Delta n(\vec{k})$ k-space distributions substantially consist of point-like distributions situated along a substantially straight line in k-space. The line segment-like $\Delta n(\vec{k})$ k-space distributions 888 are situated symmetrically about the origin, and thus may be realized as conjugate sidebands of a real-valued refractive index distribution in real space (represented as $\Delta n(\vec{r})$). In some embodiments, the modulation may include absorptive and/or emissive components, and thus may not exhibit conjugate symmetry in k-space. The complex amplitude of the distribution may be uniform, or it may vary in amplitude and/or phase while still exhibiting substantially multi-wavelength mirror-like diffraction according to embodiments of the present invention. In an embodiment, the line segment-like $\Delta n(\vec{r})$ k-space distributions are situated substantially along the $k_z$ axis, which, by convention, is the thickness direction of a recording layer.

FIG. 8B illustrates a multi-wavelength mirror-like reflective property of the hologram. Illumination of the hologram by a collimated probe beam with point-like k-space distribution 876 (represented as $E_p(\vec{r})$) results in a k-space polarization density distribution 880 (represented as $\Delta n(\vec{r})*E_p(\vec{r})$ according to Equation (4). Because the probe beam k-space distribution 876 is point-like, polarization density distribution 880 resembles a simple translation of $\Delta n(\vec{r})$ k-space distribution 888 from the origin to the tip of probe beam wave vector 878 ($\vec{k}_p$). Then, also according to Equation (4), only the part of the k-space polarization density distribution 880 ($\Delta n(\vec{r})*E_p(\vec{r})$) intersecting the k-sphere 892 of the probe beam k-space distribution 876 ($E_p(\vec{r})$) contributes to diffraction. This produces the diffracted beam k-space distribution 875, ($E_d(\vec{r})$), constituting the diffracted beam. Because $\Delta n(\vec{r})$ k-space distribution 888 resembles a line segment parallel to the $k_z$ axis, it is evident that the magnitude of the angle of reflection 882 ($\theta_r$) is substantially equal to the magnitude of the angle of incidence 881 ($\theta_i$) so that the hologram exhibits mirror-like behavior. Furthermore, it is also evident that this property typically holds for any incidence angle and wavelength that produces any diffraction at all, and for any superposition of probe beams producing diffraction. A k-space polarization distribution $\Delta n(\vec{k})*E_p(\vec{k})$ will intersect the probe k-sphere at a single point with mirror-symmetry about the $k_x$ axis (or about the $k_x$, $k_y$ plane in the 3D case). Thus, the hologram of FIG. 8A is configured to exhibit mirror-like behavior at a relatively broad range of wavelengths and angles, and thus constitutes a broadband holographic mirror.

Embodiments typically, but not necessarily, exhibit a gap in $\Delta n(k)$ k-space distribution 888 near the origin, as shown in FIG. 8A. The presence of the gap can limit performance at very high $\Delta\theta$ (i.e., grazing angles of both incidence and reflection).

According to some embodiments, a skew mirror $\Delta n(\vec{k})$ k-space distribution may be rotated to an arbitrary angle with respect to the $k_x$, $k_y$, and $k_z$ axes. In some embodiments, the $\Delta n(\vec{k})$ k-space distribution is not perpendicular to the relevant reflecting surface in real space. In other words, the reflective axis of a skew mirror embodiment is not constrained to coincident with surface normal.

Figure 9B:
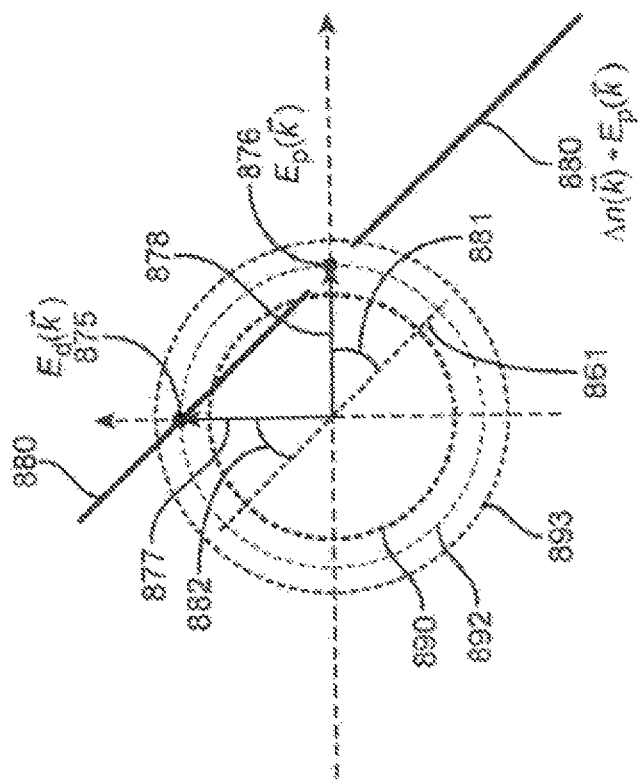
FIG. 9B is a cross-section view of a k-space representation of an illustrative skew mirror in accordance with some embodiments.
Figure 9A:
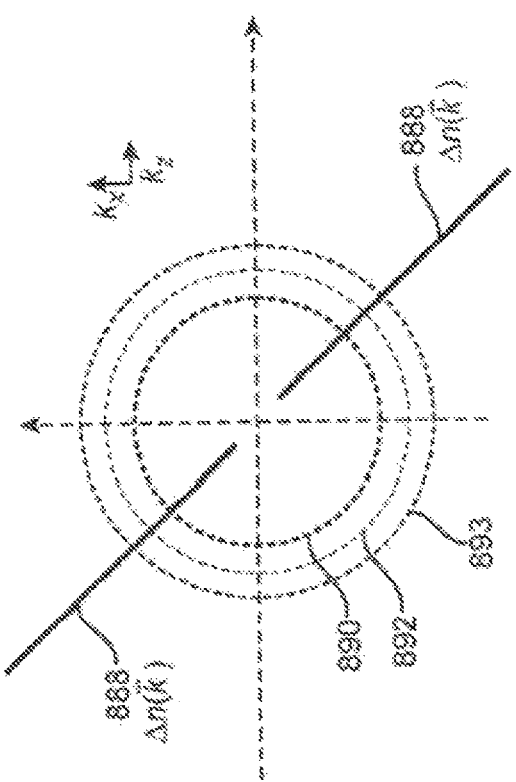
FIG. 9A is a cross-section view of a k-space representation of an illustrative skew mirror in accordance with some embodiments.

FIGS. 9A and 9B illustrate a skew mirror in k-space. FIGS. 9A and 9B are identical to FIGS. 8A and 8B, respectively, excepting that all distributions and vectors have been rotated by approximately 45° about the origin. Following the discussion of FIG. 8B, it is evident that the skew mirror of FIG. 9B also produces mirror-like diffraction for all probe beam wavelengths and angles that produce diffraction. The diffraction is mirror-like with respect to the reflective axis 861 defined by the line segment-like $\Delta n(\vec{k})$ k-space distribution 888, e.g., the angle of incidence 881 magnitude with respect to the reflective axis 861 is equal to the angle of reflection 882 magnitude with respect to the reflective axis 861. FIG. 9B illustrates one such case.

Figure 10C:
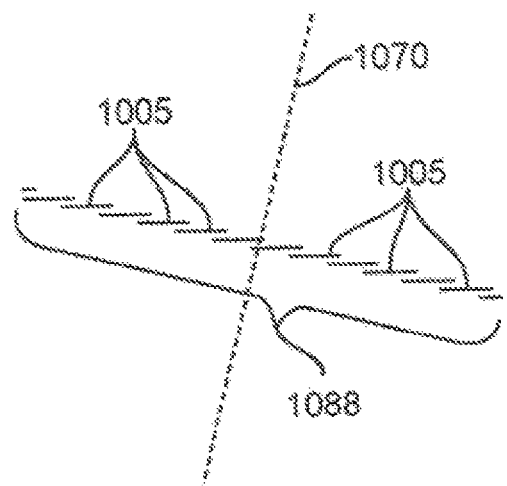
FIG. 10C is a cross-section view of a k-space representation of an illustrative skew mirror in accordance with some embodiments.
Figure 10D:
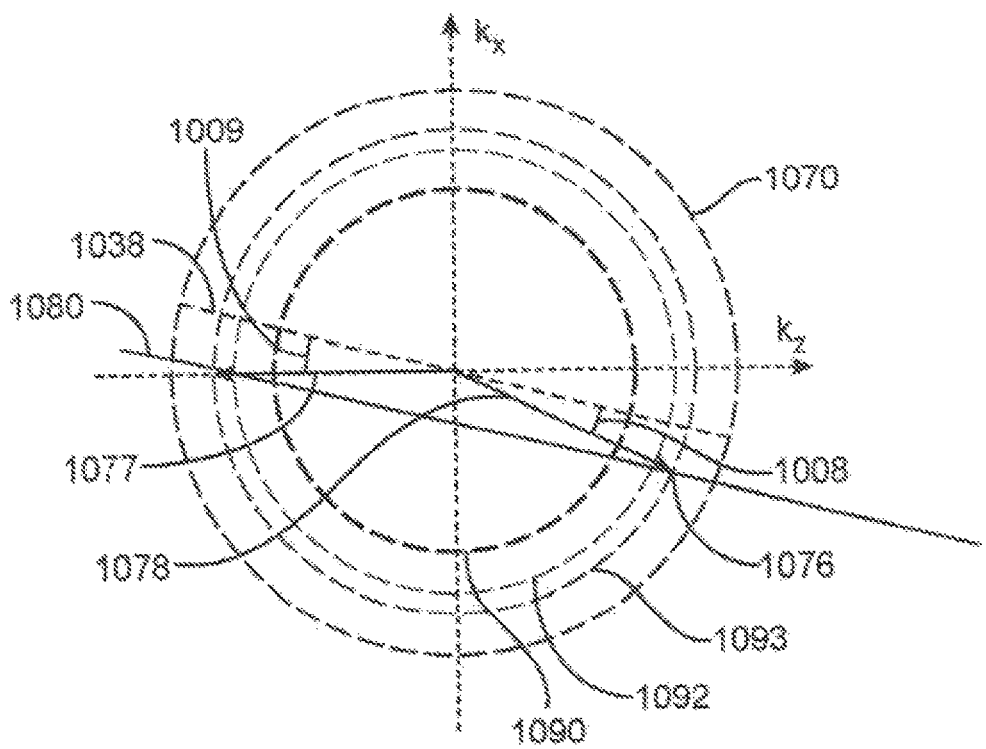
FIG. 10D is a cross-section view of a k-space representation of an illustrative skew mirror in accordance with some embodiments.
Figure 10A:
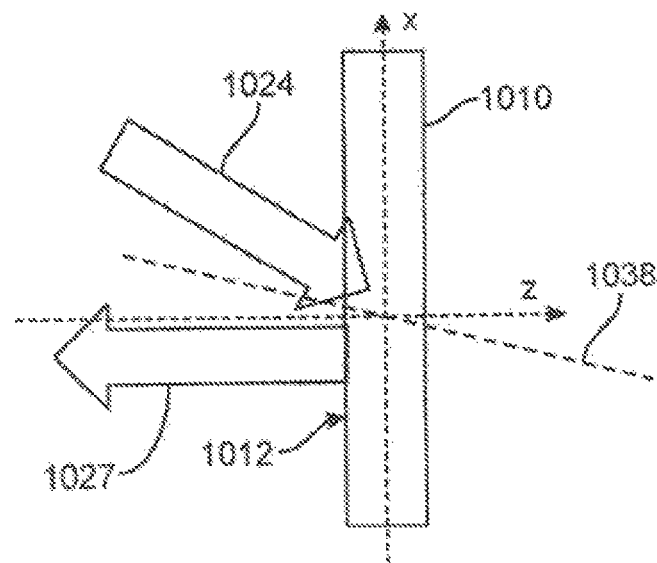
FIG. 10A is a cross-section view illustrating reflective properties of an illustrative skew mirror in accordance with some embodiments.

FIG. 10A illustrates the operation of a skew mirror in real space. Skew mirror 1010 is characterized by reflective axis 1038 at angle −13° measured with respect to the z axis, which is normal to the skew mirror surface 1012. Skew mirror 1010 is illuminated with incident light 1024 with internal incidence angle −26° measured with respect to the z axis. Principal reflected light 1027 is reflected with internal reflection angle 180° measured with respect to the z axis.

Figure 10B:
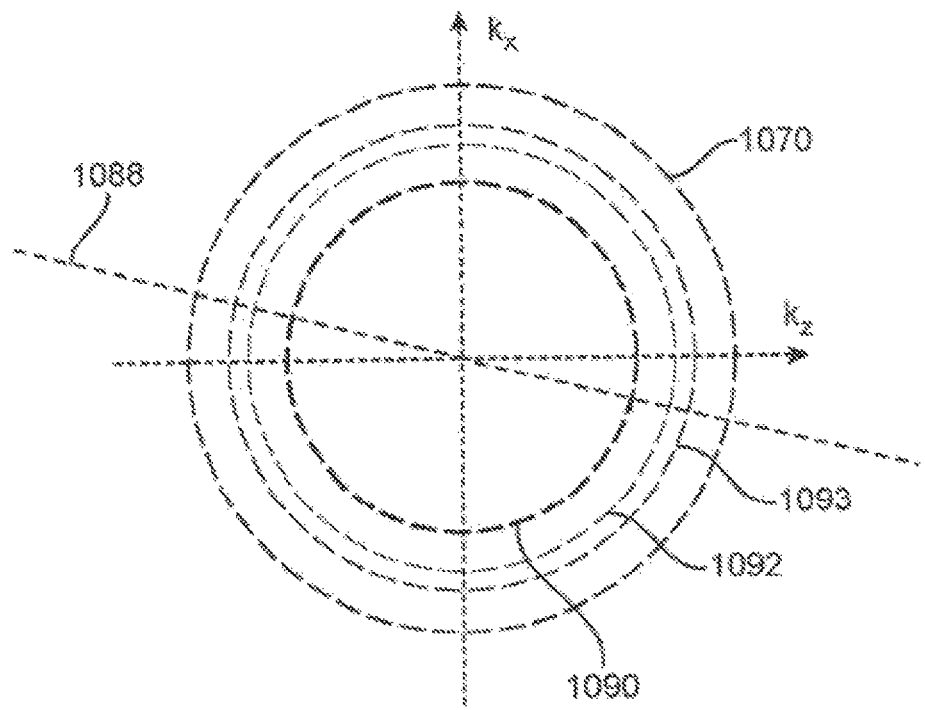
FIG. 10B is a cross-section view of a k-space representation of an illustrative skew mirror in accordance with some embodiments.

FIG. 10B illustrates the skew mirror 1010 of FIG. 10A in k-space. Line segment-like $\Delta n(\vec{k})$ k-space distribution 1088 passes through the origin, and has an angle of −13° with respect to the z axis, equal to that of reflective axis 1038. Recording k-sphere 1070 is the k-sphere corresponding to the writing wavelength of 405 nm. A red k-sphere 1090, green k-sphere 1092, and blue k-sphere 1093 in FIGS. 10B and 10D indicate k-spheres corresponding to wavelengths of light residing in the red, green, and blue regions of the visible spectrum, respectively.

FIG. 10C illustrates a highly magnified portion of FIG. 10B showing the left intersection between recording k-sphere 1070 and line segment-like $\Delta n(\vec{k})$ k-space distribution 1088 according to an embodiment. In this view, line segment-like $\Delta n(\vec{k})$ k-space distribution 1088 can be seen to be include multiple discrete holograms. Each of the multiple discreet holograms 1005 is represented by a horizontal line demarking the first null-to-first null spacing of the hologram in the $k_z$ direction. In some embodiments, the spacing of the discrete holograms may be higher or lower than illustrated in FIG. 10C. In some embodiments, the spacing may be low enough to create gaps in line segment-like $\Delta n(\vec{k})$ k-space distribution 1088. In some embodiments with gaps, the use of broadband illumination may substantially mask any effect of the gaps upon the reflected light. In some embodiments, this approach may result in a net diffraction efficiency increase. In other embodiments, the spacing of the discrete holograms may be so dense as to approximate or be equivalent to a continuous distribution.

FIG. 10D illustrates the reflection of blue incident light by the skew mirror of FIG. 10A in k-space. Incident light having a probe beam wave vector 1078 impinges with an internal incidence angle of −26° measured with respect to the z axis. The tip of probe beam wave vector 1078 lies on blue k-sphere 1093, indicating the position of point-like probe beam k-space distribution 1076 ($E_p(\vec{k})$). Polarization density distribution 1080 is given by the convolution $\Delta n(\vec{k})*E_p(\vec{k})$, which resembles line segment-like $\Delta n$ k-space distribution 1088 (seen in FIG. 10C) translated to the tip of probe beam wave vector 1078. Principal reflected light having diffracted beam wave vector 1077 is determined from equation (4) by evaluating polarization density distribution 1080 at blue k-sphere 1093. Principal reflected light having diffracted beam wave vector 1077 is reflected with internal propagation angle 180° measured with respect to the z axis.

The term probe beam, sometimes used here when describing skew mirror properties in k-space, is analogous to the term incident light, which is sometimes used here when describing skew mirror reflective properties in real space. Similarly, the term diffracted beam, sometimes used here when describing skew mirror properties in k-space, is analogous to the term principal reflected light, sometimes used here when describing skew mirror properties in real space. Thus when describing reflective properties of a skew mirror in real space, it is sometimes stated that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is sometimes stated that a probe beam is diffracted by a hologram (or other grating structure) to produce a diffracted beam, though to state that incident light is reflected by the grating structure to produce principal reflected light has the same meaning in the context of embodiments of the present disclosure.

As shown in FIG. 10D, probe beam wave vector 1078 and diffracted beam wave vector 1077 necessarily form the legs of a substantially isosceles triangle with line segment-like polarization density distribution 1080 as the base. The equal angles of this triangle are necessarily congruent with the angle of incidence, 1008, and angle of reflection 1009, both measured with respect to reflective axis 1038. Thus, skew mirror 1010 reflects light in a substantially mirror-like manner about reflective axis 1038.

The isosceles triangle construction of FIG. 10D obtains whenever Δn($\vec{k}$) k-space distribution 1088 substantially resembles a segment of a line passing through the origin, as shown in FIG. 10C. Polarization density distribution 1080 hence substantially resembles the straight base of an isosceles triangle, leading to mirror-like reflection about reflective axis 1038 for any incident internal wave vectors of any length that diffracts. In some embodiments, dispersion of the grating medium may cause internal wave vectors of the same direction but differing lengths to refract in different directions in an external medium according to Snell's law. Similarly, dispersion may cause external wave vectors of the same direction and differing lengths to refract in different directions in the internal grating medium. Accordingly, if it is desired to minimize the effects of dispersion in a skew mirror, it may be desirable to impart a curve to line segment-like Δn($\vec{k}$) k-space distribution 1088, or to otherwise deviate from a line that passes through the origin. Such an approach may reduce net angular dispersion in reflections involving external refraction according to some metric. Since the dispersion of useful grating media is typically quite low, the required deviation from a straight line passing through the origin is small. Adjustments to line segment-like Δn($\vec{k}$) k-space distribution 1088 that compensate for dispersion do not fall outside the scope of the present disclosure.

Figure 11A:
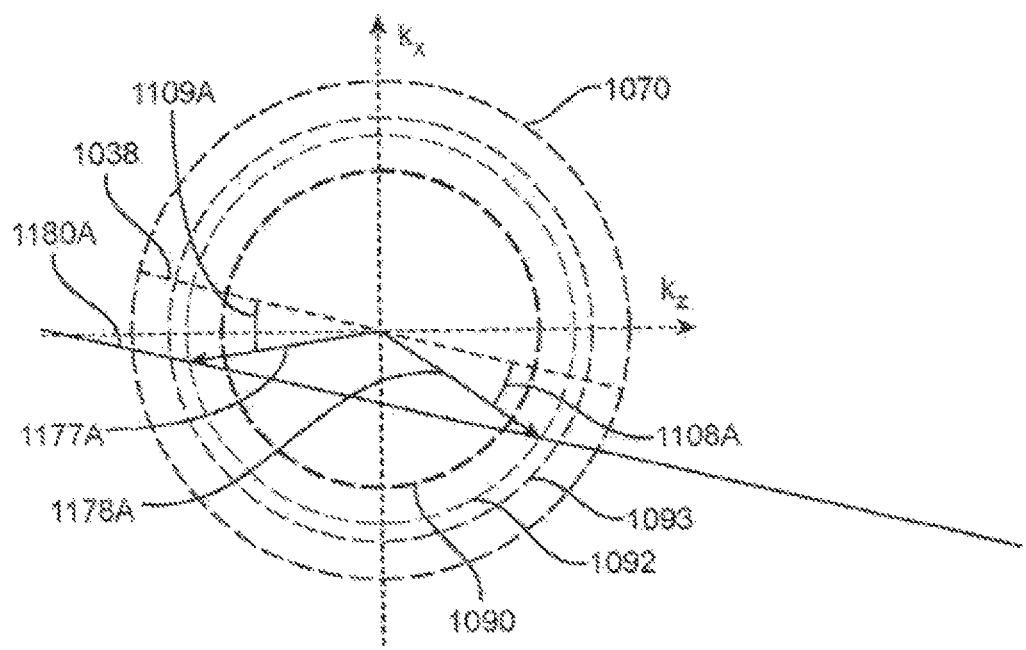
FIG. 11A is a cross-section view of a k-space representation of an illustrative skew mirror in accordance with some embodiments.

FIG. 11A illustrates the reflection of green incident light by the skew mirror of FIG. 10A in k-space. Incident light with wave vector 1178A impinges with internal propagation angle −35° measured with respect to the z axis. Principal reflected light with wave vector 1177A is reflected with internal propagation angle −171° measured with respect to the z axis. The magnitudes of angle of incidence 1108A and angle of reflection 1109A are both substantially equal to 22 degrees measured with respect to reflective axis 1038, thus constituting a mirror-like reflection about reflective axis 1038.

Figure 11B:
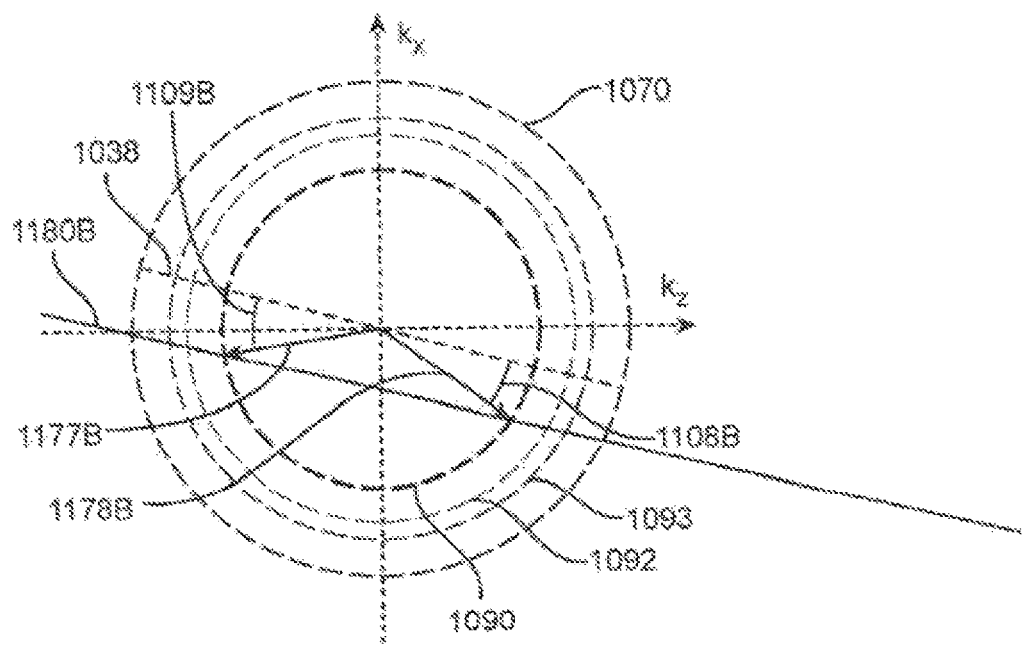
FIG. 11B is a cross-section view of a k-space representation of an illustrative skew mirror in accordance with some embodiments.

FIG. 11B illustrates the reflection of red incident light by the skew mirror of FIG. 10A in k-space. Incident light having probe beam wave vector 1178B impinges with internal propagation angle −35° measured with respect to the z axis. Principal reflected light having diffracted beam wave vector 1177B is reflected with internal propagation angle −171° measured with respect to the z axis. The magnitudes of angle of incidence 1108B and angle of reflection 1109B are both substantially equal to 22° measured with respect to reflective axis 1038, thus constituting a mirror-like reflection about reflective axis 1038.

FIGS. 11A and 11B show the reflection of green and red light at the same angles of incidence and reflection, illustrating the achromatic reflection property of the skew mirror. Those skilled in the art will recognize that the geometrical constructions of FIGS. 10A-D and 11A-B will produce mirror-like reflection at all angle/wavelength combinations that produce reflection, including angles and wavelengths not specifically illustrated.

These examples are merely illustrative and non-limiting. Embodiments of a skew mirror effect a mirror-like reflection with respect to internal propagation angles, external angles must be determined using Snell's law at the relevant boundaries. Because of this, a skew mirror may introduce aberrations, dispersion, and/or field distortion to external wavefronts. In some embodiments, aberrations, dispersion, and/or field distortions may be mitigated by the use of compensating optics. In some embodiments, the compensating optics may include another skew mirror in a symmetric relationship.

A relatively thin skew mirror may introduce lowered angular resolution in the reflected beam in proportion to the beam's projection onto the thin axis. In some cases it may be advantageous to increase the thickness of the recording layer in order to mitigate this effect. Embodiments of a skew mirror may be either fully or partially reflective. Embodiments of a skew mirror may require relatively high dynamic range recording medium to achieve high reflectivity over a relatively wide wavelength bandwidth and angle range. In an embodiment, a skew mirror with an angular range spanning 105° at 405 nm down to 20° at 650 nm may require 183 individual holograms in a 200 μm recording layer. This configuration has a reflectivity of approximately 7.5% using a photosensitive recording medium with a maximum refractive index modulation of 0.03. In some embodiments, increasing recording medium thickness may not lead to increased reflectivity since diffractive selectivity also increases with thickness.

The preceding exposition pertains to internal wavelengths and propagation angles, although in one case a slab-like hologram with thickness in the z direction was described. Many other configurations are possible within the scope of the invention. Without implying limitation, a few exemplary embodiments are illustrated here.

FIG. 12A illustrates an embodiment referred to as a skew window including grating structure 1205 in a grating medium, and including a reflective axis 1261 about which incident light is symmetrically refracted. The skew window is a transmissive analog of the skew mirror. FIG. 12B shows a skew coupler embodiment, which uses a skew mirror to couple external light into or out of a waveguide 1294. Transmissive skew couplers are also possible. FIG. 12C shows a skew prism embodiment, which may fold an optical path and/or invert an image.

FIG. 13A illustrates a pupil relay embodiment formed by a slab waveguide 1394 with two skew couplers, each of which comprises a grating medium 1310 having a reflective axis 1361 that differs from surface normal of the grating medium. Since this device is configured to relay input rays to output rays with a uniform 1:1 mapping, it can transmit an image at infinity through the waveguide 1394 to the eye or other sensor. Such a configuration may be useful for head mounted displays (HMDs), among other applications. In the reverse direction, it may relay an image of the eye, possibly for the purposes of eye tracking. FIG. 13B shows a skew mirror 1300 used as a concentrator/diffuser, which can transform a large dim beam into a bright small one, and/or vice-versa. These examples are merely illustrative. The skew mirrors described herein may be used in input couplers, output couplers, cross-couplers, interleaved couplers, diamond expanders, or any other desired light redirecting optical components in a device or optical system such as a head mounted display device (e.g., a device in which display light is redirected to an eye box, e.g., using waveguides).

Figures 14A, 14B:
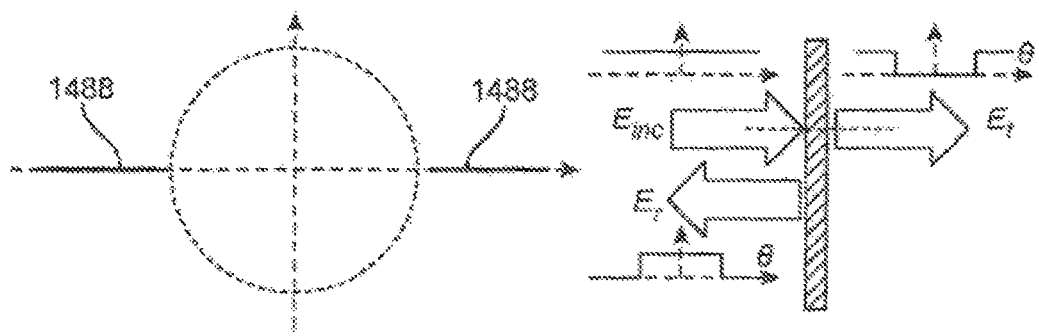
FIG. 14A is a cross-section view of a k-space representation of an illustrative skew mirror in accordance with some embodiments.
FIG. 14B is a cross-section view illustrating reflective properties of an illustrative skew mirror in accordance with some embodiments.

FIGS. 14A and 14B illustrate an angle filter embodiment of a skew mirror. In FIG. 14A, a Δn($\vec{k}$) k-space 1488 distribution is indicated with a higher low frequency cut-off (i.e., larger center gap) compared to the distribution illustrated in FIG. 8A. As a consequence, the skew mirror will reflect only the low θ (i.e., near normal incidence) angular components of narrow band incident beam into reflected beam $E_r$, while transmitting high $\theta$ angular components in $E_t$. One skilled in the art will readily discern that an arbitrary circularly-symmetric transfer function may be so realized by modulating the amplitude and/or phase of the line segment-like $\Delta n(\vec{k})$ distribution according to an embodiment of the invention. Angular filtering may also be accomplished with skew mirrors, and in configurations involving multiple skew mirrors recorded in one or more media. These configurations may not be constrained to be circularly-symmetric, and may achieve some level of achromatic operation.

Figure 15:
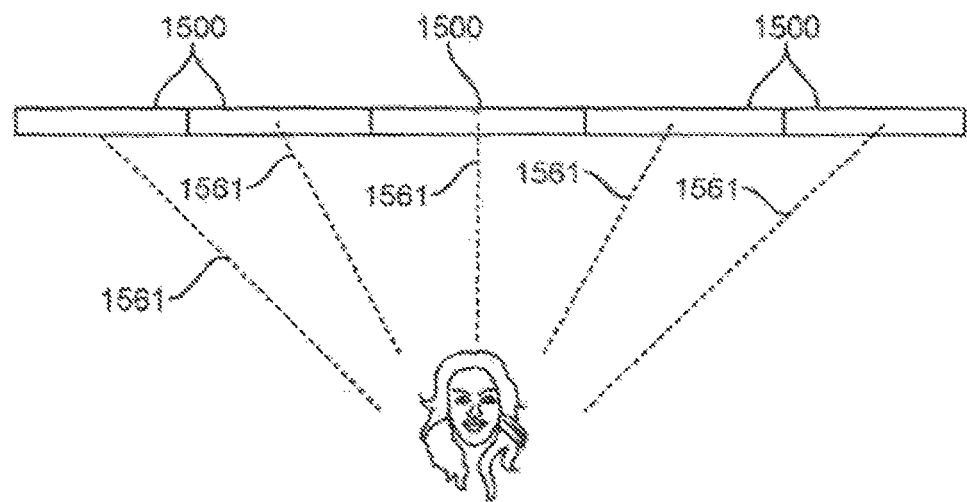
FIG. 15 is a plan view illustrating reflective properties of an illustrative skew mirror in accordance with some embodiments.

FIG. 15 illustrates another skew mirror embodiment that includes several skew mirrors 1500 whose reflective axes 1561 intersect. A viewer can sit at the point of convergence and see several images of them self. These examples are merely illustrative and non-limiting.

Figure 16A:
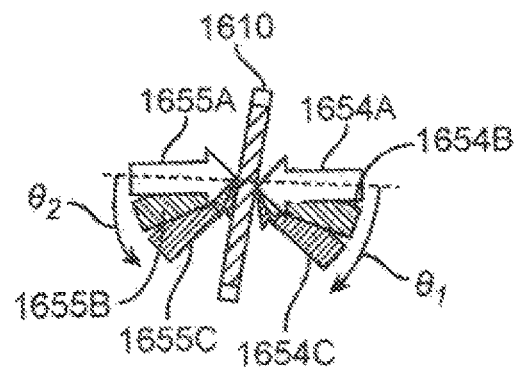
FIG. 16A is a cross-section view illustrating an illustrative system for making an illustrative skew mirror, in accordance with some embodiments.
Figure 16B:
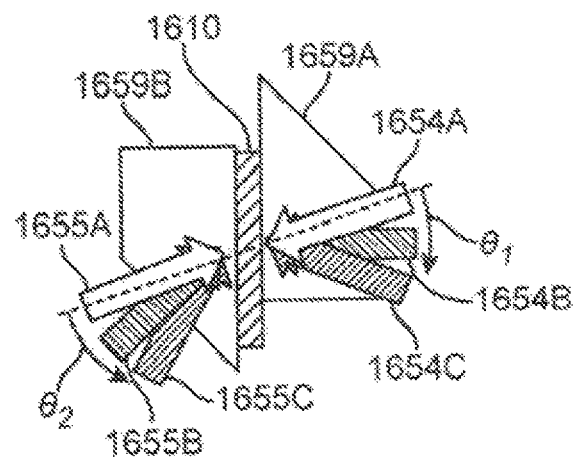
FIG. 16B is a cross-section view illustrating an illustrative system for making an illustrative skew mirror, in accordance with some embodiments.

Skew mirrors may be recorded holographically according to an embodiment. Skew mirrors may be recorded holographically or fabricated by with non-holographic means according to some embodiments. FIGS. 16A and 16B illustrate additional methods for recording skew mirrors. In FIG. 16A, substantially collimated recording beams are used to illuminate a grating medium to create a desired $\Delta n(\vec{k})$ distribution. In one embodiment, illustrated in FIG. 16A, a recording beam set consisting of a first recording beam 1654A and a second recording beam 1655A at wavelength $\lambda$ illuminate the grating medium 1610 in order to record a first point-like subset of the desired line segment-like $\Delta n(\vec{k})$ distribution, e.g. the highest-frequency components (the outer tips of $\Delta n(\vec{k})$. The angles of incidence $\theta_1$ and $\theta_2$ of a recording apparatus are then adjusted to produce another set of recording beams consisting of another first recording beam 1654B and another second recording beam 1655B, which are also at wavelength $\lambda$. The other first and second recording beams 1654B, 1655B illuminate the medium to record a second point-like subset of the desired line segment-like $\Delta n(\vec{k})$ distribution. This process is repeated using yet another set of recording beams including yet another first recording beam 1654C and yet another second recording beam 1655C, etc., until an entire desired line segment-like $\Delta n(\vec{k})$ distribution has been recorded.

In some embodiments, this recording may be made in one continuous exposure wherein $\theta_r$ and $\theta_s$ are adjusted continuously and synchronously in order to produce the desired distribution. In other embodiments, separate, discreet exposures where $\theta_r$ and $\theta_s$ are fixed during exposure and changed only between exposures are used. Still other embodiments may combine these methods. In some embodiments, the components of $\Delta n(\vec{k})$ may be written in an arbitrary order. In some embodiments, intensity may be varied across one or both beams in order to control the spatial diffraction efficiency profile. In some embodiments, a phase control element (e.g., a mirror mounted on a piezo-electric actuator) may be inserted into one or both beam paths in order to control the phase of each exposure. In some embodiments, more than one skew mirror or broadband skew mirror might be recorded into the same medium.

In the case of discrete exposures, the number and angular density of exposures is sufficient to produce a smooth, continuous line segment-like $\Delta n(\vec{k})$ distribution. In some embodiments, exposures are made at angular increments corresponding to a function of this angular selectivity, e.g., at the angular spacing of the full-width-quarter-maximum (FWQM) of the diffraction efficiency peaks. In other embodiments, the angular exposure density might be finer than this in order to assure a smooth final distribution.

The number of FWQM peaks necessary to span the line segment-like $\Delta n(\vec{k})$ distribution may be regarded as an equivalent number of holograms, M, required to form the distribution. Accordingly, the maximum possible diffraction efficiency of the resulting skew mirror may be estimated by $\eta = (M/M/\#)^2$ where $\eta$ is the diffraction efficiency, and M/# is a material parameter characterizing the dynamic range of the recording medium. This estimate may be refined according to the geometry of each individual exposure or the overlap of neighboring exposures.

FIG. 16B illustrates an embodiment where a first prism 1659A and a second prism 1659B are incorporated to produce internal beam angles that are not otherwise accessible due to refraction at the grating medium 1610 surface. This method is typically used, for example, to fabricate the skew coupler of FIG. 12B. Configurations of FIGS. 13A and 13B may also achieve a desired distribution.

In some embodiments, a single recording wavelength $\lambda$ may be chosen to write the entire line segment-like $\Delta n(\vec{k})$ distribution. For example, in an embodiment it is possible to write a skew mirror that operates across all visible wavelengths using only a 405 nm laser source. This has an advantage of requiring sufficient recording medium sensitivity at only a single wavelength, as well as an advantage of simplicity. In some embodiments, more than one recording wavelength is used. In still other cases, a continuously-variable wavelength source is used. In one such embodiment, the recording angles $\theta_r$ and $\theta_s$ are held constant, and the recording wavelength is instead changed in order to produce the entire line segment-like $\Delta n(\vec{k})$ distribution, or a subset thereof.

Other methods for producing a skew mirror fall within the scope of the present disclosure. In some embodiments, for example, a very thick dielectric layer structure is built up using optical coating means. The structure is designed to produce broadband reflectivity within sub-layers, typically by repetition of a conventional broadband reflective coating design. The thick structure is then ground and polished to produce a surface at an oblique angle to the coating layers. The resulting structure typically exhibits mirror-like behavior with respect to a reflective axis substantially defined by the normal of the coating layers rather than the polished surface, and thus constitutes a skew mirror. In some embodiments, atomically-precise manufacturing methods enable fabrication of skew mirrors by composing dielectric structures atom-by-atom without regard to external surfaces.

Skew mirrors may be said to be non-flat in two senses: 1) When the physical shape of the recording medium is not flat; and 2) when the holographic fringes are not planar. Embodiments of mirrors according to the present disclosure, including examples of skew mirrors, broadband mirrors, and holographic mirrors, include holograms recorded in medium that is not slab-like in shape. In an example, in an embodiment, a recording layer is cast with a uniform thickness, but on a curved surface. In another example, a non-uniform recording layer (e.g., wedge-shaped) is utilized. In still another example, an arbitrary shape (e.g., spherical) is molded. In these non-slab-like mirror cases, whether the designation "skew mirror" is appropriate depends on the geometry of the relevant surface(s). Non-slab-like holographic mirrors typically exhibit broadband mirror-like properties.

In some embodiments, it is desirable to introduce optical power or other deliberate aberrations into a reflection. This can be accomplished with embodiments of a skew mirror by locally varying the direction of the reflective axis, for example so that a plane-wave incident beam is reflected to form a spherical-wave reflected beam, as occurs with a conventional parabolic mirror. Such a skew mirror can be fabricated, for instance, by using one converging and one diverging beam in the fabrication method of FIG. 13 and by recording while changing the wavelength instead of the angle of incidence. Such a mirror can also be fabricated by polishing dielectric layers deposited on a non-flat surface, or by using advanced atomically-precise manufacturing methods.

Some holographic recording system embodiments incorporates mirrors, lenses and prisms to direct first and second recording beams into the grating medium in such a way that translation of the grating medium is not required to record multiple holograms at varying recording beam internal angles, at approximately the same location in the grating medium.

In some embodiments a prism in addition to the coupling prism may be used to fabricate the skew mirror. In some embodiments a variety of coupling prisms and flat pieces of glass may be used. In some embodiments multiple beams, $E_{r\_N}$ and $E_{s\_N}$, at multiple wavelengths, $\lambda_N$, may be. In some embodiments multiple wavelengths may be used to fabricate multiple discrete line segment-like $\Delta n(\vec{k})$ distributions. In some embodiments multiple wavelengths may be used to fabricate a line segment-like $\Delta n(\vec{k})$ distribution that may be continuous or may include closely spaced sections. In some embodiments the incident angle of the signal and/or reference beam may be adjusted to compensate for shrinkage of the sample material. In some embodiments the sample may be rotated to compensate for shrinkage of the sample material. In some embodiments the wavelength may be changed to compensate for shrinkage of the sample material.

Two holograms may be said to be pair-wise coherent if illumination by a probe beam produces diffracted beams substantially in a desired fixed phase relationship. In the case of non-orthogonal probe or diffracted beams, pair-wise coherence may manifest as a constructive or destructive interference pattern between diffracted beams. When input light at one input angle diffracts off of two holograms, the diffracted light may be come out at slightly different angles (e.g., within the angular resolution of the skew mirror). Conversely, light at two slightly different input angles (e.g., within the angular resolution of the skew mirror) may diffract off of the two holograms to merge into the same angle out.

Of particular interest is the case of neighboring holograms within a skew mirror. The neighboring holograms may, for example, be adjacent holograms in the skew mirror. The magnitude of a difference in grating frequency between any two holograms in a skew mirror described herein may sometimes be referred to as frequency gap $|\Delta K_G|$. Frequency gap $|\Delta K_G|$ can be a useful metric for describing hologram "spacing" (e.g. how close to each other in k-space the grating vectors for the any two holograms are). The frequency gap $|\Delta K_G|$ between a given hologram and an adjacent hologram (e.g., in k-space) may sometimes be referred to as the adjacent frequency gap $|\Delta K_G|$.

Among a set of multiple holograms (e.g., a set of volume holographic gratings in a skew mirror), each hologram in the set has a corresponding grating vector in k-space. The grating vector has a corresponding grating vector magnitude $K_G$. A first hologram in the set is sometimes referred to as being "adjacent" or "neighboring" to a second hologram in the set of holograms when the second hologram has the next highest or next lowest grating vector magnitude $K_G$ relative to the grating vector magnitude of the first hologram (among the holograms in the set). Each hologram in the set may be separated from one or two adjacent holograms in the set by an adjacent frequency gap $|\Delta K_G|$. The adjacent frequency gap $|\Delta K_G|$ may be the magnitude of the difference between the grating vector magnitudes $K_G$ for the adjacent holograms. For example, the first hologram in the set may have a first grating vector magnitude $K_{G1}$, the second hologram in the set may have a second grating vector magnitude $K_{G2}$, and the first grating vector magnitude $K_{G1}$ may be separated from the second grating vector magnitude $K_{G2}$ in k-space by the adjacent frequency gap $|\Delta K_G|$ (e.g., the first and second holograms may be "adjacent" or "neighboring" holograms in the skew mirror).

Each hologram in the set (skew mirror) is separated from one or more other holograms in the set by a corresponding adjacent frequency gap $|\Delta K_G|$ (e.g., the adjacent frequency gaps across the set need not be uniform). In some embodiments, the mean adjacent frequency gap $|\Delta K_G|$ for the entire set of holograms may influence the performance of the skew mirror. The grating vector magnitude $K_G$ of a given hologram may determine the grating frequency for the hologram (e.g., the frequency of refractive index modulations in the grating medium in physical space as well as the wavelength of light that is Bragg matched to the hologram). Grating vector magnitude $K_G$ may therefore sometimes be referred to herein as grating frequency $K_G$. Each hologram in the set of holograms has a corresponding grating frequency $K_G$. The direction of the grating vector associated with grating frequency $K_G$ may give the direction (orientation) of the refractive index modulations in the grating medium in physical space. Grating frequency $K_G$ and the frequency gap $|\Delta K_G|$ may be expressed in various units, including, but not limited to, radians per meter (rad/m) and/or sinc peak to sinc nulls.

A relatively small mean adjacent frequency gap $|\Delta K_G|$ for the set of holograms can correspond to relatively high skew mirror image fidelity (e.g., for the entire set of holograms). However, a relatively small mean adjacent frequency gap $|\Delta K_G|$ may result in an overlap between the diffracted beams of neighboring holograms, allowing them to interfere with each other. Also, where the mean adjacent frequency gap $|\Delta K_G|$ for a set of holograms is relatively small, the total number of holograms in the set is larger in order to span a given adjacent frequency gap $|\Delta K_G|$ range for the set. Moreover, given that recording capacity for grating mediums is typically limited by dynamic range (usually expressed as $\Delta n$), recording more holograms in a set usually means that each hologram in the set is weaker (e.g., is recorded more faintly in the medium). Accordingly, tension exists between having relatively small adjacent frequency gaps $|\Delta K_G|$ for a set of holograms (which requires more holograms, other things being equal), and having larger adjacent frequency gaps $|\Delta K_G|$ for the set, which allows recording of fewer, but stronger holograms.

Neighboring holograms within a skew mirror are of particular interest with respect to pair-wise coherence, because neighboring holograms may produce non-orthogonal overlapping diffracted beams in response to a single plane-wave probe beam component. In these situations, it may be desirable to control the pair-wise coherence of the holograms in order to achieve constructive interference among overlapping diffractive beams (sometimes referred to herein as "constructive coherence"). For example, this may prevent dark lines from appearing in reflected images using narrow band illumination due to destructive interference between neighboring holograms in the skew mirror. A skew mirror with constructive pair-wise coherence and dense holograms may closely approximate the performance of an idealized skew mirror written with scanning beams in a single exposure, rather than a series of exposures as used to manufacture skew mirrors in practice. In other embodiments, it may be desirable to deliberately create destructive interference or some other interference state. In some embodiments, a 90 degree phase difference between overlapping diffracted beams may be desirable so that neither constructive nor destructive interference will manifest.

Figure 17:
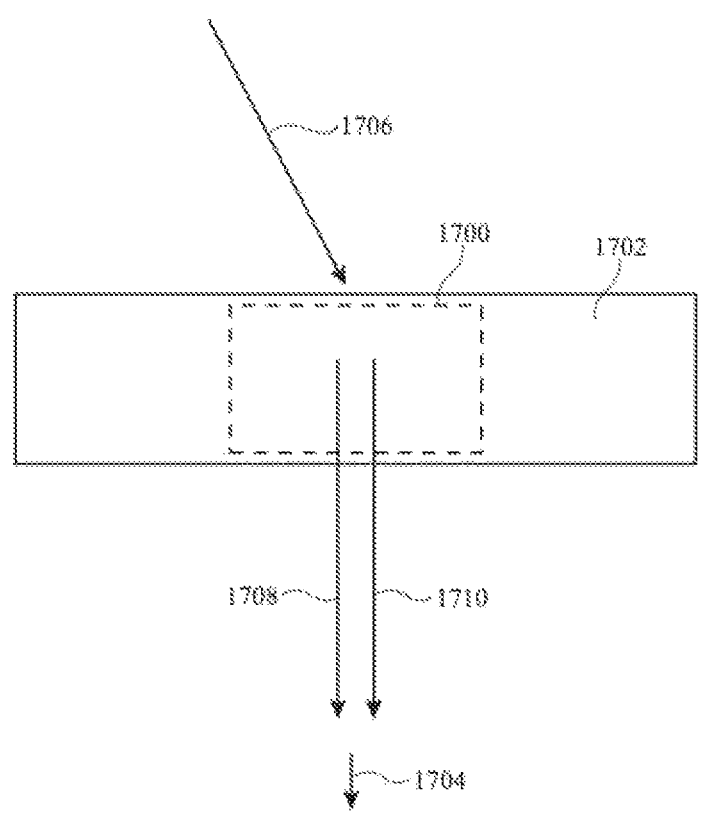
FIG. 17 is a diagram of an illustrative skew mirror having pair-wise coherent holograms in accordance with some embodiments.

FIG. 17 is a diagram showing how a skew mirror may include pair-wise coherent gratings (holograms). As shown in FIG. 17, a skew mirror 1700 (e.g., a set of gratings/holograms) may be formed in grating medium 1702. The skew mirror may be used for any of the optical devices described above and may exhibit diffractive properties as described above in connection with FIGS. 1-16, for example. Skew mirror 1700 may include a set of at least partially overlapping holograms within a given volume of grating medium 1702. Each hologram in the set may have a different respective grating frequency (e.g., grating vectors with different magnitudes but oriented in the same direction). Each hologram may be configured to redirect incident light into a given direction such as direction 1704 (e.g., towards an eye-box in scenarios where the skew mirror is used to form an output coupler).

At least two of the holograms in the set (e.g., in skew mirror 1700) may be pair-wise coherent. As an example, the at least two holograms that are pair-wise coherent may be adjacent holograms in the set (skew mirror). The at least two holograms are pair-wise coherent if illumination by a probe beam produces diffracted beams substantially in a desired fixed phase relationship (e.g., if input light to each hologram is coherent and the corresponding light diffracted by each hologram is also coherent). For example, the at least two holograms may include a first hologram having a first grating frequency $K_{G1}$ and a second hologram having a second grating frequency $K_{G2}$ that is different from the first grating frequency (e.g., adjacent to the first grating frequency in k-space). The first and second holograms may both receive coherent probe beam 1706 from a light source or other optical components. The first hologram may diffract probe beam 1706, as shown by diffracted beam 1708. The second hologram may also diffract probe beam 1710, as shown by diffracted beam 1710. Diffracted beams 1708 and 1710 may be coherent (e.g., in a desired fixed phase relationship with each other). In this way, the first and second holograms may be pair-wise coherent, for example. This example is merely illustrative. In general, any desired number of holograms in skew mirror 1700 may be pair-wise coherent (e.g., may each diffract light that is coherent with the diffracted light from the other holograms in response to a coherent probe beam). In one practical example, probe light 1706 may correspond to light of a single frequency that has been emitted from a single display pixel spanning a very small range of angles (e.g., 0.02 degrees or less). Diffracted beams 1708 and 1710 may correspond to overlapping images or partial images of this display pixel. Depending on the phase relation between diffracted beams 1708 and 1710, the pixel may appear of uniform illumination, or may exhibit a bright or dark band caused by interference between diffracted beams 1708 and 1710.

Figure 18:
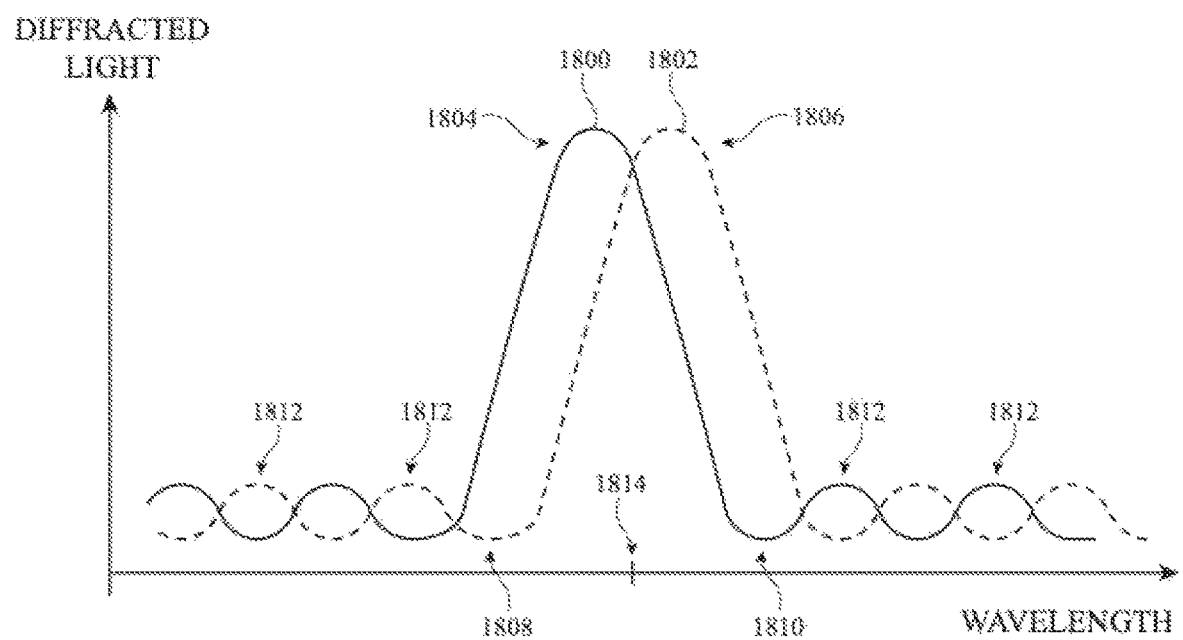
FIG. 18 is a diagram showing a first hologram in an illustrative skew mirror may have a spectral peak aligned with a spectral null in an adjacent second hologram in the skew mirror in accordance with some embodiments.

It may sometimes be desirable for the peak in the diffraction response for a first hologram to lie within a null of the diffraction response for a pair-wise coherent and adjacent second hologram in the skew mirror. It may be especially important for the first and second holograms to be pair-wise coherent in this example. FIG. 18 shows a diagram of diffracted light as a function of wavelength for these illustrative adjacent first and second holograms. As shown in FIG. 18, the first hologram may have a first grating frequency (e.g., $K_{G1}$) that configures the first hologram to exhibit a diffraction response as shown by curve 1800. Similarly, the second hologram may have a second grating frequency (e.g., $K_{G2}$ separated from the first grating frequency by an adjacent frequency gap) that configures the second hologram to exhibit a diffraction response as shown by curve 1802.

As shown by curve 1802, the diffraction response of the second hologram is configured so that the spectral peak 1806 in the diffraction response of the second hologram lies within a spectral null 1810 of the diffraction response of the first hologram. Similarly, the diffraction response of the first hologram is configured so that spectral peak 1804 in the diffraction response of the first hologram lies within a spectral null 1808 in the diffraction response of the second hologram. The diffraction peaks may, if desired, also be configured so that the spectral peaks of side-lobes 1812 for one hologram align with the spectral nulls of the side-lobes 1812 for the other hologram. When configured in this way, an incident photon at wavelength 1814 will diffract off of either the first or second hologram. If the first and second holograms are not pair-wise coherent, this may produce a black line in the diffracted light when viewed at a screen that is displaced from the holograms. Configuring the first and second holograms to be pair-wise coherent may serve to mitigate these issues.

In practice, it can be difficult to manufacture skew mirrors having pair-wise coherent holograms. Manufacturing (writing) apparatuses for these types of skew mirrors may need to be very precise in order to ensure that two or more holograms in the skew mirror are pair-wise coherent. Consider, for example, a scenario where a writing apparatus of the type shown in FIG. 3 is used.

In theory, a skew mirror writer could achieve constructive coherence by exactly path-length matching the recording beams (e.g., beams 354 and 355 in FIG. 3) at the same location within the recording medium over all beam angles and stage positions. In some embodiments, small misalignments and errors in stage motion may introduce phase errors in the written holograms, thus producing non-pair-wise coherence in adjacent holograms of the skew mirror.

Figure 19:
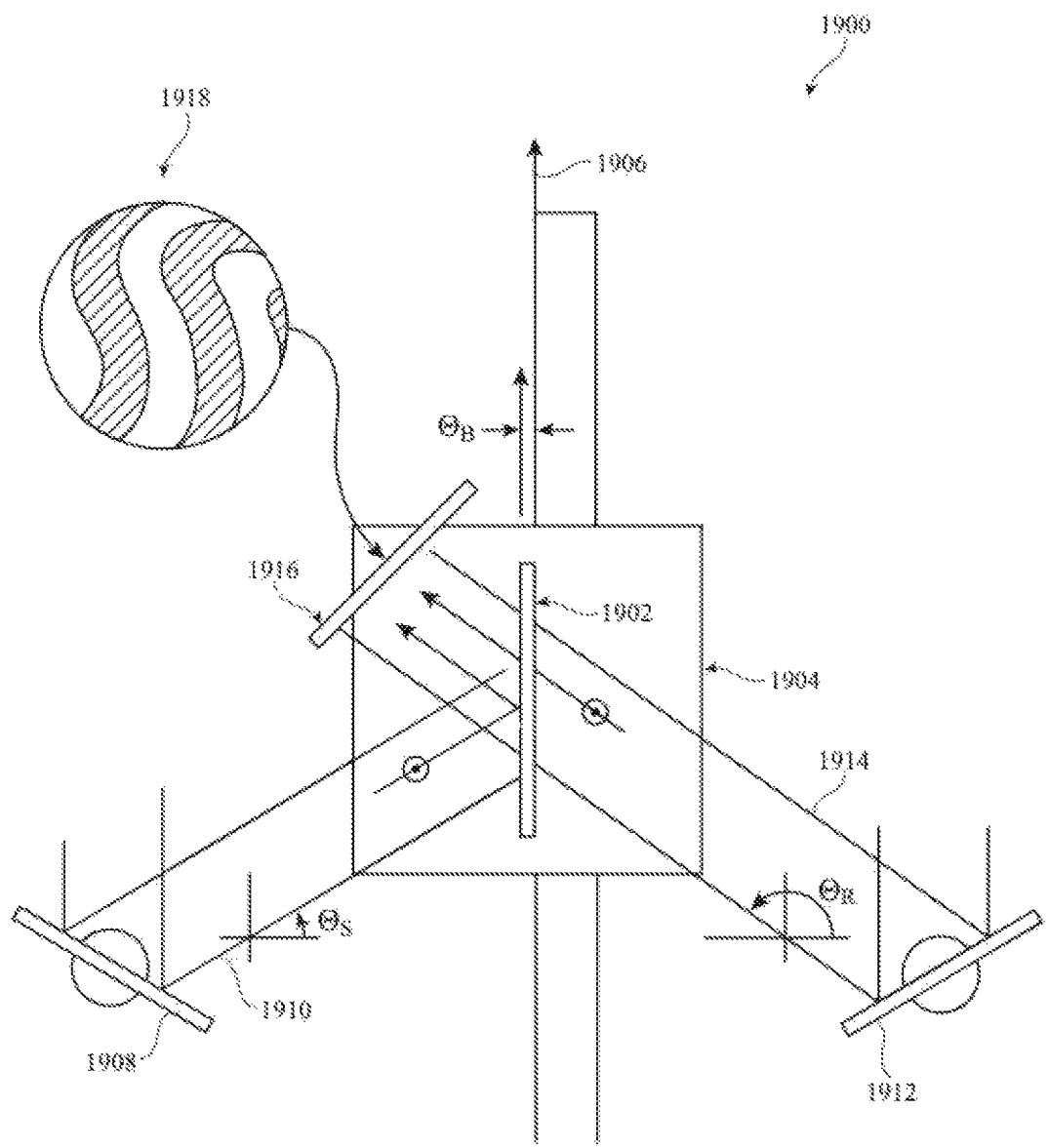
FIG. 19 is a diagram of an illustrative system that may be aligned for making an illustrative skew mirror having pair-wise coherent holograms in accordance with some embodiments.

In some embodiments, passive alignment of a skew mirror writer allows the holograms to exhibit pair-wise coherence. FIG. 19 is a diagram showing an example of one possible manufacturing system for producing coherent skew mirrors with pair-wise coherent holograms. As shown in FIG. 19, system 1900 (sometimes referred to herein as manufacturing system 1900, manufacturing apparatus 1900, writing system 1900, writing apparatus 1900, recording system 1900, or recording apparatus 1900) may be provided for writing coherent skew mirrors with pair-wise coherent holograms.

In system 1900 of FIG. 19, the prism package containing the recording medium of FIG. 3 has been replaced with a non-polarizing beam splitter 1902 substantially aligned with the axis of translation 1906 (sometimes referred to herein as stage axis 1906 or translation axis 1906) for stage carrier 1904. Mirror 1908 may reflect signal beam 1910 towards beam splitter 1902. Mirror 1912 may reflect reference beam 1914 towards beam splitter 1902. Mirror 1908 may be rotated to provide signal beam 1910 at angle $\theta_S$. Mirror 1912 may be rotated to provide reference beam 1914 at angle $\theta_R$. Stage carrier 1904 may be translated along stage axis 1906. Beam splitter 1902 may be rotated by angle $\theta_B$ with respect to stage axis 1906.

Signal beam 1910 may reflect off of beam splitter 1902 towards detector 1916. Detector 1916 may be a photodetector (image detector) or other sensor that senses light. In another suitable arrangement, detector 1916 may be a card, wall, or screen for viewing light that hits the card, wall, or screen. Reference beam 1914 may transmit through beam splitter 1902 towards detector 1916. This is merely illustrative and, if desired, the reference beam may reflect off of the beam splitter whereas the signal beam is transmitted by the beam splitter. This may permit the reflected signal beam 1910 to be combined with the transmitted reference beam 1914 (or vice-versa), forming an interference pattern 1918 at detector 1916 indicative of the relative phases between beams 1910 and 1914. Two holograms will exhibit constructive pair-wise coherence when the fringes in pattern 1918 are in the same phase at both writing conditions (e.g., the fringes appear to remain stationary when changing from one condition to another).

In order to achieve this condition, system 1900 may be aligned using an alignment method such as the following. First, angle $\theta_S$ may be set to a particular value. Next, angle $\theta_R$ may be adjusted to generate coarse fringes in pattern 1918. The position of stage carrier 1904 may subsequently be adjusted (e.g., via translation along axis 1906). Next, beam splitter 1902 may be rotated to adjust angle $\theta_B$ until fringe motion is reduced in pattern 1918. This may serve to align fringe planes with stage axis 1906 and, in some arrangements, to align the surface of beam splitter 1902 to the stage axis (e.g., so that angle OB is approximately zero). Once this is achieved, the corresponding pair of angles $\theta_S$ and $\theta_R$ may be saved and used to record pair-wise coherent holograms on a grating medium placed on stage carrier 1904. This alignment method is merely illustrative and, in general, other alignment strategies may be employed to achieve the fine alignment necessary to write pair-wise coherent holograms in a skew mirror.

Figure 20:
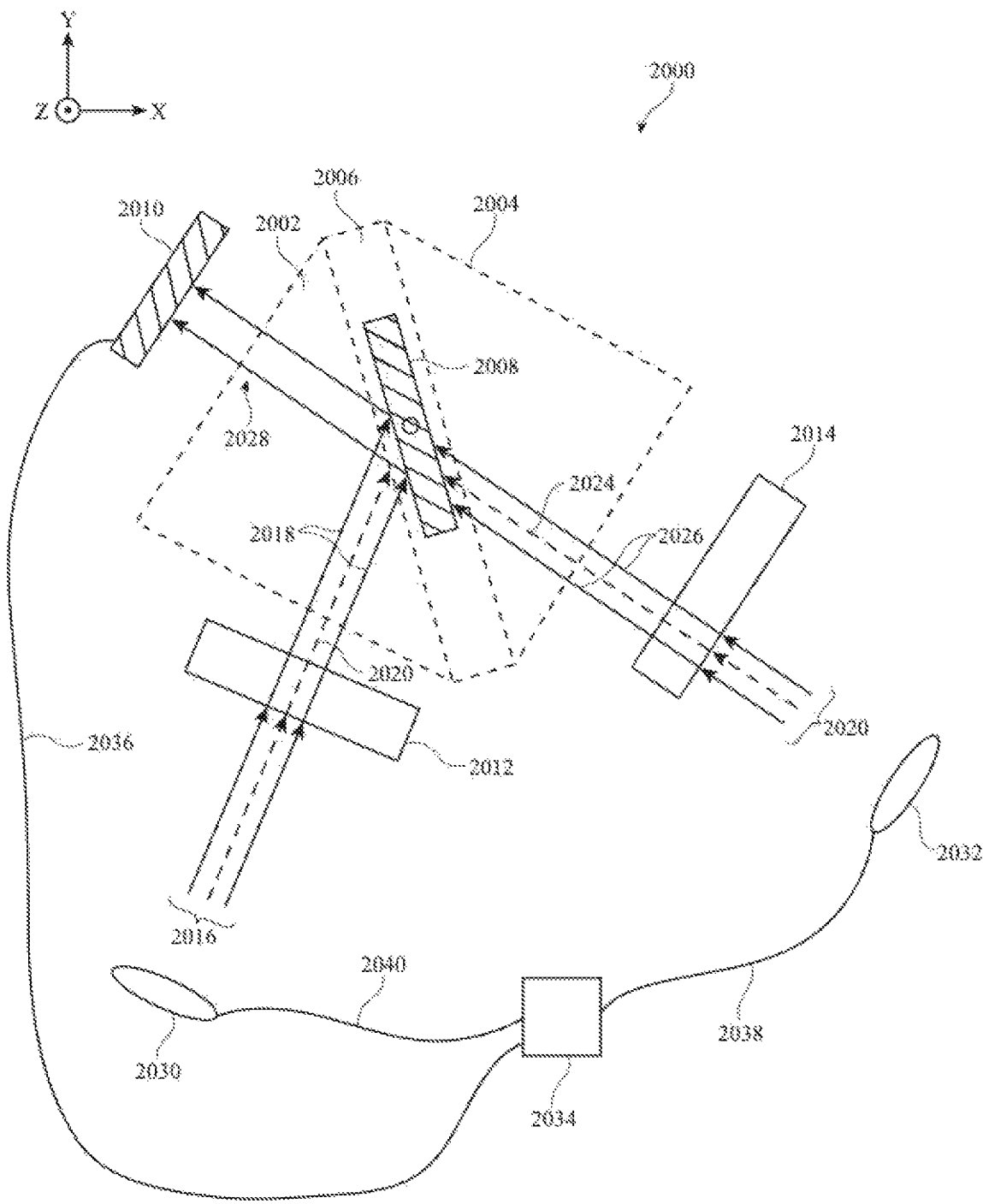
FIG. 20 is a diagram of an illustrative system that may be actively aligned for making an illustrative skew mirror having pair-wise coherent holograms in accordance with some embodiments.

In some embodiments, an active alignment method may be used to actively align the writing system while the pair-wise coherent holograms are being written (or before/between writings of multiple holograms). Such an active alignment method may improve the pair-wise coherence relative to the initial alignment method described above in connection with FIG. 19. FIG. 20 is a diagram showing an example of one possible manufacturing system for producing coherent skew mirrors with pair-wise coherent holograms using active alignment methods.

As shown in FIG. 20, system 2000 (sometimes referred to herein as manufacturing system 2000, manufacturing apparatus 2000, writing system 2000, writing apparatus 2000, recording system 2000, or recording apparatus 2000) may be provided for writing coherent skew mirrors with pair-wise coherent holograms using active alignment methods. As shown in FIG. 20, system 2000 may include prisms 2002 and 2004 on opposing sides of grating medium 2006, on which pair-wise coherent holograms in a skew mirror are to be written. Signal beam 2016 may be provided by a first light source (e.g., via a reflecting mirror, etc.). Reference beam 2020 may be provided by a second light source (e.g., via a reflecting mirror, etc.).

Active alignment structures may be mounted over or under prisms 2002 and 2004 (e.g., on top of the prisms or otherwise in a plane above or below the prisms). For the sake of illustration, the active alignment structures are described herein as being mounted over prisms 2002 and 2004. The active alignment structures may include partial reflector 2008 (e.g., a partial reflector such as a 50% partial reflector) and detector 2010 (e.g., a linear detector, image sensor, or other light sensor). Partial reflector 2008 may be stationary or may rotate (e.g., for field of view expansion). Light redirecting components such as periscopes 2012 and 2014 may extend from the plane of prisms 2002 and 2004 upwards (e.g., parallel to the Z-axis) to the plane of partial reflector 2008 and detector 2010. Periscope 2012 may redirect a portion of signal beam 2016 upwards into the plane of partial reflector 2008 and detector 2010, as shown by beam 2018. Beam 2018 may reflect off of partial reflector 2008 towards detector 2010. Similarly, periscope 2014 may redirect a portion of reference beam 2020 upwards into the plane of partial reflector 2008 and detector 2010, as shown by beam 2026. Beam 2026 may pass through partial reflector 2008 and combine with signal beam 2018 to produce a combined beam 2028 that is received by detector 2010. The example of FIG. 20 is merely illustrative and, in another suitable arrangement, signal beam 2018 may transmit through partial reflector 2008 whereas reference beam 204 reflects off of partial reflector 2008.

While periscope 2012 redirects some of signal beam 2016 towards partial reflector 2008, periscope 2012 may allow the remainder of signal beam 2016 to pass to grating medium 2006 (e.g., in the plane below the active alignment structures), as shown by beam 2020. Similarly, periscope 2014 may allow the remainder of reference beam 2020 to pass to grating medium 2006, as shown by beam 2024. Beams 2020 and 2024 may be used to write pair-wise coherent holograms for a corresponding skew mirror in grating medium 2006. Detector 2010 may measure fringe patterns associated with signal beam 2016 and reference beam 2020. Detector 2010 may provide sensor data (e.g., image data or other data identifying the intensity of combined beam 2028 across its length and thus the interference/fringe pattern produced by combining beams 2018 and 2026) to controller 2034 over control path 2036. Controller 2034 may process this data to determine whether signal beam 2016 is suitably aligned with reference beam 2020 for recording pair-wise coherent holograms (e.g., by identifying and analyzing fringe patterns in the data).

If controller 2034 determines that the signal beam and reference beam are not suitably coherent (aligned) based on the data received from detector 2010, controller 2034 may control alignment adjustment structure 2030 over path 2040 or alignment adjustment structure 2032 over path 2038 to adjust the physical path lengths or effective path lengths (relative phases) of signal beams 2016 and 2020 (e.g., to adjust a difference in physical or effective path length between the beams) until the beams are suitably coherent. Alignment adjustment structures 2030 and 2032 may include, for example, piezo-electric actuators, translational structures, rotational structures, piezo-actuated phase shifting mirrors, and/or any other desired structures for adjusting the effective or physical path lengths of signal beam 2016 and reference beam 2020. This process may be performed iteratively (e.g., using active feedback from detector 2010) until the beams are suitably adjusted for recording pair-wise coherent holograms on medium 2006.

Masking structures (not shown) may be used to shield grating medium 2006 from the signal and reference beams during this active alignment procedure if desired. For example, these active alignment procedures may be performed immediately prior to exposure of each hologram in grating medium 2006 (e.g., so that measurements and adjustments may be made immediately prior to the exposure of each hologram in order to assure pair-wise coherence with the preceding hologram). In general, measurement with detector 2010 and/or adjustment using structures 2030 and/or 2032 may be performed at any desired times, including during exposure of a hologram on grating medium 2006. In this example, the writing beams themselves are used for measurement and alignment. This is merely illustrative and, in another suitable arrangement, separate test beams may be used to perform measurement and alignment.

Figure 21:
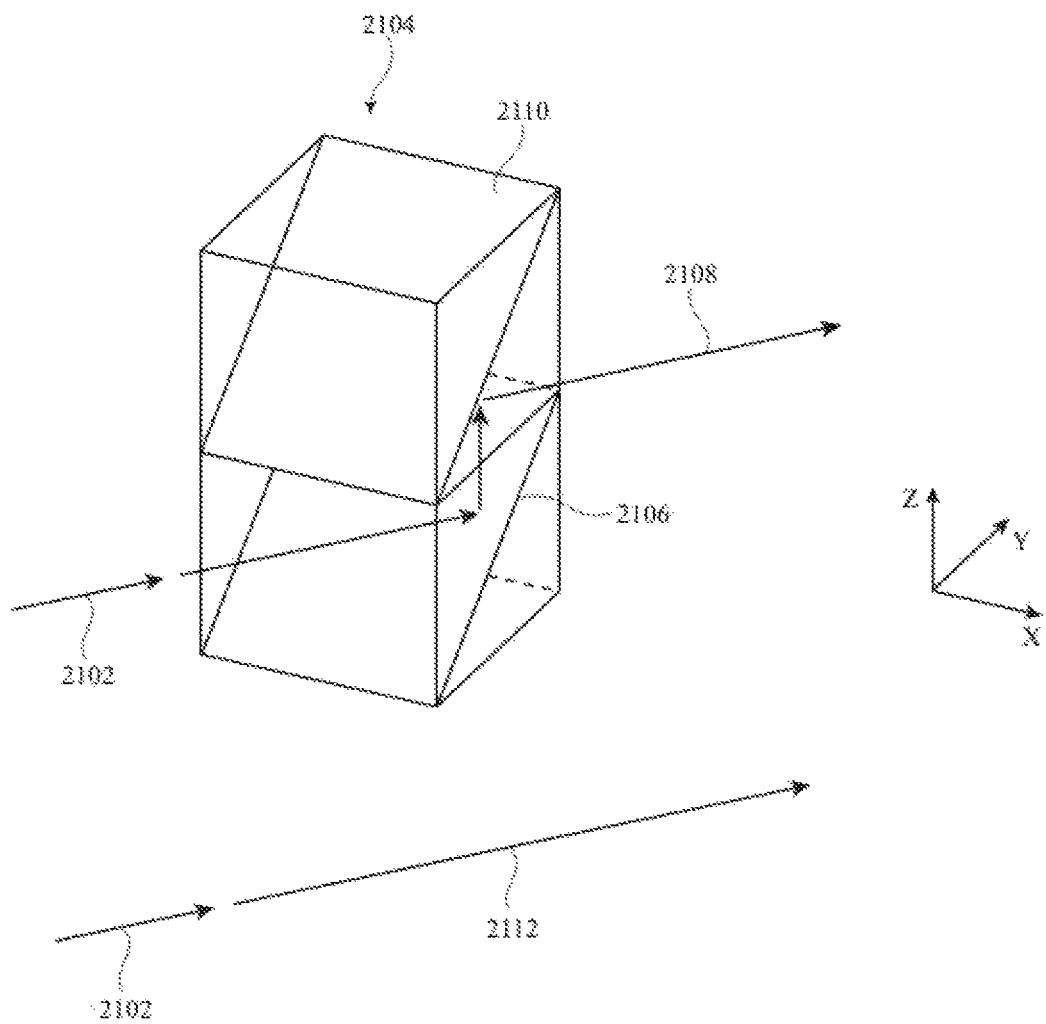
FIGS. 21 and 22 are perspective views of illustrative periscopes that may be used in a system of the type shown in FIG. 20 in accordance with some embodiments.

FIG. 21 shows a perspective view of an exemplary periscope 2104 that may be used in forming periscope 2012 and/or periscope 2014 of FIG. 21. As shown in FIG. 21, periscope 2104 may include a first slanted/reflective surface 2106 that is interposed in the aperture associated with beam 2102 (e.g., signal beam 2016 or reference beam 2020 of FIG. 20). Surface 2106 may reflect a portion of beam 2102 upwards (e.g., parallel to the Z-axis) to slanted/reflective surface 2110. Surface 2110 may reflect this portion of beam 2102 outwards as beam 2108 (e.g., towards partial reflector 2008 of FIG. 20). The remainder of beam 2102 may continue to propagate, as shown by beam 2112 (e.g., towards the grating medium). As shown in FIG. 21, beam 2108 may extend parallel to beam 2112 but in a plane over beam 2112. This may allow the same writing light to both be used for recording holograms and for sampling to measure and align the writing system. The example of FIG. 21 is merely illustrative. If desired, surface 2110 may be separated from surface 2106 by any desired distance (e.g., so that beam 2108 is located within a desired plane such as the plane of partial reflector 2008 of FIG. 20).

Figure 22:
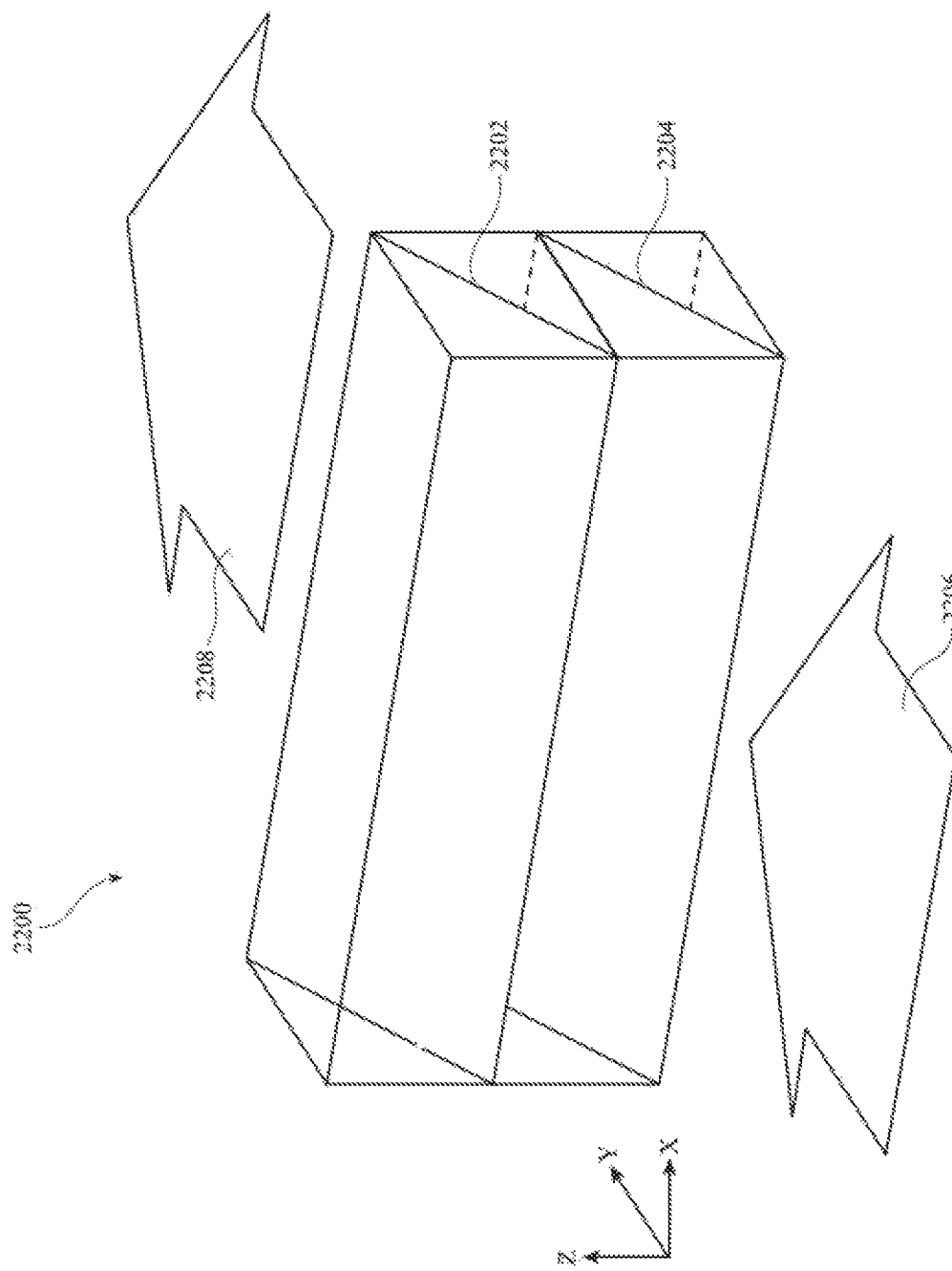

FIG. 22 shows a perspective view of an exemplary periscope 2200 that may be used in forming periscope 2012 and/or periscope 2014 of FIG. 21. As shown in FIG. 22, periscope 2200 may include relatively wide slanted (reflective) surfaces 2204 and 2202 for redirecting a portion of a relatively wide signal beam 2206 towards the beam splitter, as shown by arrow 2208. This may, for example, allow a sample slit to travel along different portions of the width of the beam. In this way, the periscopes in the writing system may raise the beams of light so that the light can be measured and the system can be adjusted to provide sufficiently coherent reference and signal beams for writing pair-wise coherent holograms in the skew mirror. The examples of FIGS. 20-22 are merely illustrative. The periscopes shown in FIGS. 20-22 may be replaced with any desired light redirecting elements.

Figure 23:
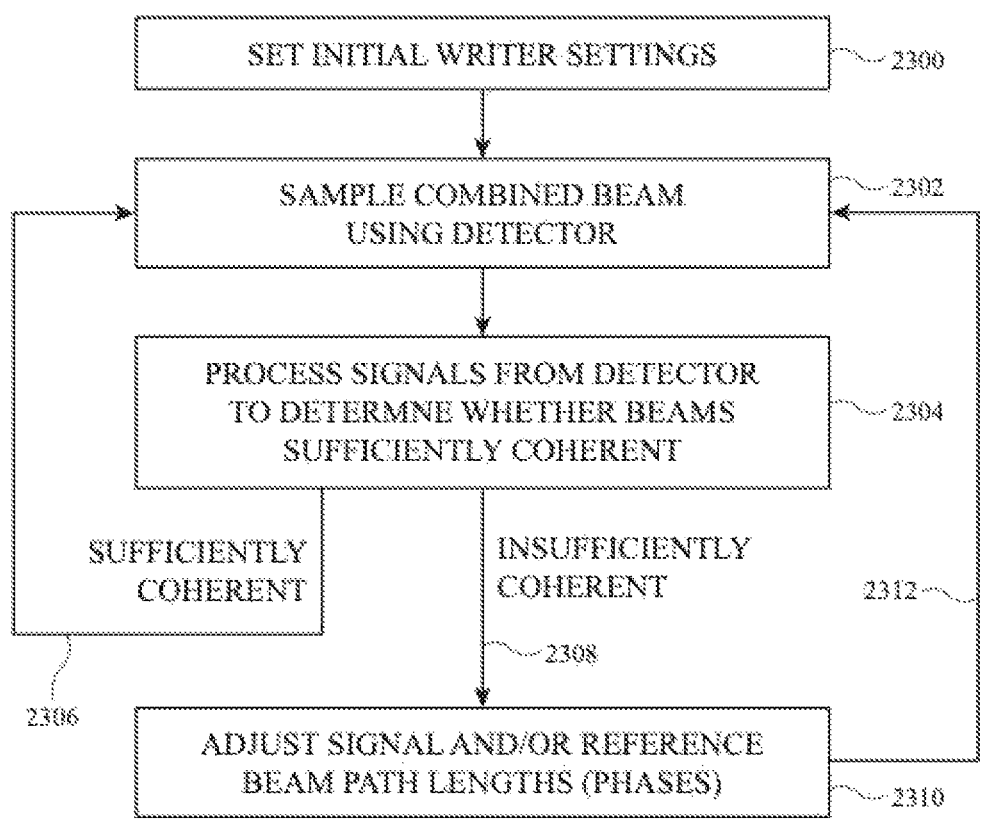
FIG. 23 is a flow chart of illustrative steps that may be used in actively aligning a system of the type shown in FIG. 20 for making an illustrative skew mirror having pair-wise coherent holograms in accordance with some embodiments.

FIG. 23 is a flow chart of illustrative steps that may be used in performing active alignment for writing coherent skew mirrors with pair-wise coherent holograms (e.g., using system 2000 of FIG. 20 or using any other desired writing apparatus). At step 2300, the initial settings of the writing system (e.g., system 2000 of FIG. 20) may be set. The initial settings may involve setting the signal and reference beam angles, path lengths, and/or the prism and grating medium position and orientation relative to the beams (e.g., for recording a desired hologram in the grating medium).

At step 2302, the periscopes (e.g., periscopes 2012 and 2014 of FIG. 20) may redirect a portion of the signal and reference beams to the beam splitter (e.g., beam splitter 20008 of FIG. 20), which combines the beams and provides the combined beam to the detector (e.g., photodetector 2010 of FIG. 20). The detector may sample the combined beam and provide corresponding signals to the controller.

At step 2304, the controller (e.g., controller 2034 of FIG. 20) may process the signals generated by the detector. For example, the controller may measure grating phases being recorded based on fringes in the signals generated by the detector. The controller may determine whether the signal and reference beams are sufficiently coherent (e.g., sufficiently coherent to record pair-wise coherent holograms in the grating medium). If the beams are sufficiently coherent, processing may loop back to step 2302 as shown by path 2306 to continue to monitor the alignment of the system (or the controller may wait until the next hologram is to be written, in which case processing will return to step 2300 to set the system up for writing the next hologram). If the beams are not sufficiently coherent (e.g., such that pair-wise coherent holograms will not be written in the grating medium), processing may proceed to step 2310, as shown by path 2308.

At step 2312, the controller may adjust one or both of the beam path lengths or phases (effective path lengths) using suitable adjustment structures (e.g., structures 2030 and/or 2032 of FIG. 20). As an example, the controller may adjust a piezo-actuated phase shifting mirror that passes the signal beam to adjust a phase (effective path length) of the signal beam. Processing may subsequently loop back to step 2302, as shown by path 2312, to sample whether this adjustment has produced sufficiently aligned beams. This process may be repeated (iterated) until coherent beams are provided that are suitable for writing pair-wise coherent holograms.

The steps of FIG. 23 may, for example, be repeated for each hologram to be written. The steps of FIG. 23 may be performed before a grating medium has been placed in the writing apparatus or after a grating medium has been placed in the writing apparatus. The steps of FIG. 23 may be performed prior to each hologram exposure and/or during hologram exposure. The steps of FIG. 23 may be performed using the writing beams or using separate test (probe) beams. For example, a first probe beam extending parallel to the signal beam and a second probe beam extending parallel to the reference beam may be directed towards the partial reflector shown in FIG. 20 instead of the signal and reference beams used for writing the holograms. The probe beams trace optical paths parallel to these writing beams. For example, the probe beams may reflect off of mirrors 152A and 152B of FIG. 4 (or separate mirrors stiffly coupled to mirrors 152A and 152B), the partial reflector may be mounted to the same structure as medium 110 of FIG. 4, and the probe beams may reflect off of any upstream mirrors reflecting the writing beams where path length perturbations may be introduced. This example is merely illustrative and, in general, other operations may be performed to write pair-wise coherent holograms for the skew mirror, desired. The steps of FIG. 23 and the other methods and operations described herein may be performed by executing instructions (e.g., computer code) stored on storage circuitry such as memory using a processor (e.g., a microprocessor, CPU, or other processing circuitry at controller 2034 of FIG. 20). Non-transitory, computer-readable storage media may be used to store the executed code for performing these steps, for example.

In some embodiments, the system of FIG. 20 may be configured to enable the recording of pair-wise coherent holograms in the presence of mechanical disturbances such as vibration (e.g., physical vibrations from nearby or distant footsteps, passing vehicles, seismic activity, sound, weather conditions, etc.). For example, controller 2034 of FIG. 20 may include a servo controller that uses feedback from sensor 2010 to control (actuate) alignment adjustment structures 2030 and/or 2032 so that the coherent phase condition is dynamically maintained regardless of the presence of vibration or other motion. In some embodiments, such a servo may allow the system to record pair-wise coherent holograms more quickly by reducing the settling time required after mechanical stage motions are performed. In some embodiments, such a servo may allow the system to record pair-wise coherent holograms while mechanical stage motions are in progress.

While various embodiments have been described and illustrated herein, other means and/or structures for performing the function and/or obtaining the results and/or one or more of the advantages described herein may be used, and each of such variations and/or modifications is deemed to be within the scope of the embodiments described herein. More generally, all parameters, dimensions, materials, and configurations described herein are merely illustrative and actual parameters, dimensions, materials, and/or configurations may depend upon the specific application or applications for which the embodiments is/are used. The embodiments may be practiced in any desired combination. Also, various concepts may be embodied as one or more methods, devices or systems, of which an example has been provided. The acts performed as part of a method or operation may be ordered in any suitable way. Accordingly, embodiments may be constructed in which acts are performed in an order different than illustrated, which may include performing some acts simultaneously, even though shown as sequential acts in embodiments. As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. Transitional phrases such as "comprising," "including," "carrying," "having," "containing," "involving," "holding," "composed of," and the like are to be understood to be open-ended, i.e., to mean including but not limited to. The term "approximately," refers to plus or minus 10% of the value given.

The term "approximately" as used herein refers to plus or minus 10% of the value given. The term "about," refers to plus or minus 20% of the value given. The term "principally" with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light. The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. A reflective axis angle may be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation. Unless reference is made to a specific wavelength or range of wavelengths, such as "visible light," which refers to a part of the electromagnetic spectrum visible to the human eye, the electromagnetic radiation can have any wavelength. The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space). The term "diffraction efficiency" refers to the ratio of the power of reflected light to incident light and on a grating medium. The term "entrance pupil" refers to a real or virtual aperture passing a beam of light, at its minimum size, entering into imaging optics. The term "eye box" refers to a two-dimensional area outlining a region wherein a human pupil may be placed for viewing the full field of view at a fixed distance from a grating structure. The term "eye relief" refers to a fixed distance between a grating structure and a corresponding eye box. The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector. In some cases, an exit pupil may comprise a subset of a beam of light emerging from imaging optics.

The term "grating medium" refers to a physical medium that is configured with a grating structure for reflecting light. A grating medium may include multiple grating structures. The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium. Skew mirrors as described herein may sometimes also be referred to herein as grating structures, holographic grating structures, or volume holographic grating structures.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

In accordance with an embodiment, an optical device is provided that includes a waveguide having first and second waveguide substrates, a grating medium between the first and second waveguide substrates, a prism mounted to the first waveguide substrate, where the prism is configured to couple light into the grating medium, the grating medium has a first abbe number, and the prism has a second abbe number that is different from the first abbe number, and a set of overlapping holograms in the grating medium, where the set of overlapping holograms is configured to direct a first wavelength of the light coupled into the grating medium in a given direction through a given one of the first and second waveguide substrates and is configured to direct a second wavelength of the light coupled into the grating medium in the given direction through the given one of the first and second waveguide substrates.

The foregoing is merely illustrative and various modifications can be made to the described embodiments. The foregoing embodiments may be implemented individually or in any combination.

What is claimed is:

1. A display system configured to display images, the display system comprising:
   a waveguide;
   a grating medium on the waveguide and configured to receive light that includes at least a portion of the images;
   a first hologram in the grating medium, wherein the first hologram has a first grating frequency and is configured to diffract the light as first diffracted light having a first spectral peak, a side-lobe spectral peak, and a spectral null; and
   a second hologram in the grating medium, wherein the second hologram has a second grating frequency that is different from the first grating frequency, the second hologram is configured to diffract the light as second diffracted light having a second spectral peak, the second diffracted light has a side-lobe spectral null overlapping the side-lobe spectral peak of the first diffracted light, and the second spectral peak of the second diffracted light overlaps the spectral null of the first diffracted light.

2. The display system of claim 1, wherein the second diffracted light has an additional spectral null and the first spectral peak of the first diffracted light overlaps the additional spectral null of the second diffracted light.

3. The display system of claim 2, wherein the first hologram at least partially overlaps the second hologram in the grating medium.

4. The display system of claim 3, wherein the first and second holograms are pair-wise coherent with each other.

5. The display system of claim 1, wherein the first and second holograms are pair-wise coherent with each other.

6. The display system of claim 1, wherein the first hologram at least partially overlaps the second hologram in the grating medium.

7. The display system of claim 1, wherein the first hologram comprises a first volume hologram and the second hologram comprises a second volume hologram.

8. A head-mounted display device comprising:
   a light source that produces light;
   a waveguide;
   a grating medium on the waveguide and configured to receive the light;
   a first diffractive grating in the grating medium, wherein the first diffractive grating has a first grating frequency and is configured to diffract the light as first diffracted light having a first spectral peak and a first spectral null;
   a second diffractive grating in the grating medium, wherein the second diffractive grating has a second grating frequency that is different from the first grating frequency and is configured to diffract the light as second diffracted light having a second spectral peak and a second spectral null, the first spectral peak overlapping the second spectral null; and
   a cross-coupler on the waveguide and comprising the first and second diffractive gratings.

9. The head-mounted display device of claim 8, wherein the second spectral peak overlaps the first spectral null.

10. The head-mounted display device of claim 8, wherein the second diffractive grating is pair-wise coherent with the first diffractive grating.

11. The head-mounted display device of claim 8, wherein the first diffractive grating comprises a first volume hologram and the second diffractive grating comprises a second volume hologram.

12. The head-mounted display device of claim 8, wherein the first diffractive grating at least partially overlaps the second diffractive grating in the grating medium.

13. The head-mounted display device of claim 8 further comprising an output coupler on the waveguide, wherein the output coupler comprises the first and second diffractive gratings.

14. The head-mounted display device of claim 8 further comprising an input coupler on the waveguide, wherein the input coupler comprises the first and second diffractive gratings.

15. A head-mounted display device comprising:
a waveguide;
a grating medium on the waveguide; and
first and second volume holograms that are at least partially overlapping on the grating medium, wherein the first volume hologram is configured to diffract light incident upon the grating medium as first diffracted light having a spectral peak, the second volume hologram is configured to diffract the light as second diffracted light having a spectral null overlapping the spectral peak, and the first volume hologram is pair-wise coherent with the second volume hologram.

16. The head-mounted display device of claim 15, wherein the first diffracted light has an additional spectral null and the second diffracted light has an additional spectral peak that overlaps the additional spectral null.

* * * * *